(12) United States Patent
    Raduchel

(10) Patent No.: US 11,176,767 B2
(45) Date of Patent: *Nov. 16, 2021

(54) MANAGING GEOSPATIAL BOUNDARIES

(71) Applicant: eIngot LLC, Great Falls, VA (US)

(72) Inventor: William J. Raduchel, Palo Alto, CA (US)

(73) Assignee: eIngot LLC, Great Falls, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/021,463

(22) Filed: Sep. 15, 2020

(65) Prior Publication Data

US 2020/0410798 A1    Dec. 31, 2020

Related U.S. Application Data

(63) Continuation of application No. 16/778,999, filed on Jan. 31, 2020, now Pat. No. 10,846,962.

(60) Provisional application No. 62/799,672, filed on Jan. 31, 2019.

(51) Int. Cl.
    *G07C 9/22*    (2020.01)
    *G06Q 50/26*   (2012.01)
    *G07C 9/27*    (2020.01)
    *G07C 9/29*    (2020.01)

(52) U.S. Cl.
    CPC .............. *G07C 9/22* (2020.01); *G06Q 50/26* (2013.01); *G07C 9/27* (2020.01); *G07C 9/29* (2020.01)

(58) Field of Classification Search
    CPC ... G07C 9/22; G07C 9/29; G07C 9/28; G06Q 50/26; G06K 9/00771

USPC .......................................................... 340/5.7
See application file for complete search history.

(56) References Cited

U.S. PATENT DOCUMENTS

| | | | |
|---|---|---|---|
| 7,619,533 B2* | 11/2009 | Crucilla | G08B 21/0286 340/573.4 |
| 9,491,183 B1 | 11/2016 | Dippenaar | |
| 10,555,111 B2 | 2/2020 | Trevathan et al. | |
| 2002/0149467 A1* | 10/2002 | Calvesio | G07C 9/257 340/5.52 |
| 2009/0266882 A1 | 10/2009 | Sajkowsky | |
| 2011/0156864 A1 | 6/2011 | Green | |
| 2012/0218078 A1 | 8/2012 | Hill | |
| 2012/0232958 A1* | 9/2012 | Silbert | G06Q 30/02 705/7.34 |
| 2013/0154795 A1 | 6/2013 | Devaux et al. | |
| 2014/0219583 A1 | 8/2014 | Bezine et al. | |

(Continued)

OTHER PUBLICATIONS

PCT International Search Report and Written Opinion in International Appln. No. PCT/US2020/016237, dated Apr. 27, 2020, 16 pages.

*Primary Examiner* — Vernal U Brown
(74) *Attorney, Agent, or Firm* — Fish & Richardson P.C.

(57) ABSTRACT

Methods, systems, and apparatus, including computer programs encoded on computer-storage media, for managing geospatial boundaries. In some implementations, an identification of a user is scanned. Based on the scan, information corresponding to the user is retrieved. The user is then registered using the retrieved information corresponding to the user. Location data is obtained. A determination is made that the user is proximate to a geographic boundary. The location data and at least a portion of the information corresponding to the user is transmitted to an access control system.

23 Claims, 12 Drawing Sheets

(56) References Cited

U.S. PATENT DOCUMENTS

| | | |
|---|---|---|
| 2015/0088775 A1 | 3/2015 | McIntire et al. |
| 2017/0103265 A1 | 4/2017 | Channah et al. |
| 2018/0005239 A1 | 1/2018 | Schlesinger et al. |
| 2018/0189561 A1 | 7/2018 | Bertan et al. |

* cited by examiner

Profile of Shipment A     _224_

Itinerary and Transportation     _402_
- From: Dublin, Ireland (1/30)
- To: London, UK (1/31 – expected)
- Transportation: Truck (#05-D-12345) and Ferry

Contents     _404_
- 2 Packages of Laptop computers (5,000 kg)
- 1 Package of Cosmetics A (2,000 kg)
- 1 Package of Cosmetics B (1,900 kg)

Recent Events     _406_
- Shipment approaching Irish border at 1:00 PM on 1/30
- Shipment picked up at 8:00 AM on 1/30
- ...

Flags     _408_
- UK has banned the importation of Cosmetics A

FIG. 4

MANAGING GEOSPATIAL BOUNDARIES

CROSS-REFERENCE TO RELATED APPLICATIONS

This application is a continuation of U.S. application Ser. No. 16/778,999, filed Jan. 31, 2020, which claims the benefit of U.S. Provisional Application No. 62/799,672, filed Jan. 31, 2019. The contents of this application is incorporated herein by reference in its entirety.

FIELD

The present disclosure relates to security systems.

BACKGROUND

Managing the flow of individuals and goods across geospatial boundaries can be a complex undertaking. Providing one or more interested parties the electronic assurances to authorize transactions and/or movements sufficient to verify regulatory requirements (or support desired velocities) may require the integration of communications between asynchronous or disjoint systems.

SUMMARY

A regulatory system or regime may desire to account for the movement of individuals or goods through and across one or more geospatial boundaries. For example, border authorities may implement various techniques and technologies to track individuals and products crossing their border and to prevent entrance of unauthorized individuals and goods. For example, countries have implemented different visual surveillance techniques using drones, boats, helicopters, blimps, or the like and different imaging technologies such as thermal imaging. Despite these efforts, unauthorized individuals and goods regularly cross international borders. Physical inspection of every traveler, good, vehicle, and/or may be highly inefficient insofar as a great deal of resources are consumed to achieve the required degree of visibility into the underlying inspected article, person, or vehicle. In addition, different frameworks (e.g., treaties, commercial agreements, or laws) may impose granular constraints such that actual inspection becomes even more difficult to ascertain compliance. For example, an agricultural restrictions may permit the transportation of greenhouse-grown tomatoes across a geospatial boundary while precluding shipment of outdoor produce across that same boundary. Similarly, inspected goods may be freely transported between different bonded warehouses while uninspected goods may be barred from transport until inspected.

Irrespective of whether the transportation regime is a commercial relationship (e.g., a customer and a supplier), an antitheft deterrent system, or administration of a jurisdictional boundary, an intermediary system may be configured to receive electronic credentials for an individual or article, register those credentials with an inspection server, structure the credentials as a proposed movement record, inspect the record for compliance with applicable requirements, and selectively authorize the proposed movement record to proceed in accordance with a stated itinerary, path, or movement. The credentials may be integrated with assurance and compliance systems so that the inspection server can leverage additional information in selectively authorizing the stated itinerary, path, or movement. In addition, the inspection server may be configured to interface with a physical access control system (e.g., traffic control system, physical barriers, and turnstiles) so that authorized individuals and goods may proceed in travelling in an uninterrupted manner while unauthorized or goods may be diverted to facilitate additional investigation.

For example, in some implementations, border control can be administered through a system that includes a mobile device of user and an access control system. In some implementations, the system also includes a management system. The system can determine when users, e.g., citizens, are at or are approaching an international border. The system can proceed to determine if the users are permitted to cross the border by, for example, comparing the users with one or more lists of unauthorized citizens. If a user is determined to be unauthorized, the system may notify one or more additional systems or persons as to presence and location of the user. In addition, the system may send one or more instructions or notifications to a mobile device of the user.

In some implementations, the system can also determine when shipments of goods are at or are approaching an international border. The system can proceed to determine if the shipment of goods or if part of the shipment is permitted to cross the border by, for example, comparing the goods in the shipment with one or more lists of unauthorized, e.g., banned, goods. If all or part of a shipment is determined to be unauthorized, the system may notify one or more additional systems or persons as to presence and location of the shipment and a corresponding user, e.g., the shipper. In addition, the system may send one or more instructions or notifications to a mobile device of the user. The system can access a bill of lading to determine whether the shipped goods are authorized to proceed without additional inspection.

In some implementations, a smartphone-based application links to a user's identification such as their passport and facilitates the user's crossing of an international boundary. The smartphone-based application may communicate with an existing access control system, such as physical access control system (PACS), traffic management system (TMS), and/or pedestrian entrance control system (PECS), of an international border in order to grant or deny access to the user.

The system can access a bill of lading to determine whether the shipped goods are authorized to proceed without additional inspection.

In some implementations, the smartphone-based application may send a signal indicating that a PACS, TMS, and/or PECS should grant a user entry based on a determination that the user is compliant. A user may be determined to be compliant if they have been successfully registered through the smartphone-based application. A user may be determined to be compliant if they have been registered through the smartphone-based application and their profile has not been flagged or revoked.

In some implementations, the smartphone-based application may send a signal indicating that PACS, TMS, and/or PECS should deny a user entry based on a determination that the user is noncompliant. A user may be determined to be noncompliant if they have not been registered through the smartphone-based application or if their profile has been flagged or revoked. Additionally, a user may be determined to be noncompliant if they fail to follow instructions received through the application from the access control system.

In one general aspect a method is performed by a computing device. In some implementations, the method includes scanning, by the computing device, an identification of a user; based on the scan, retrieving, by the computing device, information corresponding to the user; registering, by the computing device, the user using the information corresponding to the user; obtaining, by the computing device, location data; determining, by the computing device, that the user is proximate to a geographic boundary; and transmitting the location data and at least a portion of the information corresponding to the user to an access control system.

In some implementations, the method further includes comparing the location data with geospatial data, where determining that the user is proximate to the geographic boundary includes determining that the user is at the geographic boundary.

In some implementations, the method further includes comparing the location data with geospatial data, where determining that the user is proximate to the geographic boundary includes determining that the user is approaching the geographic boundary based on the comparison.

In some implementations, the information includes at least one of a name of the user, an identification number corresponding to the user, an address of the user, a date of identification issuance, a date of identification expiration, a birth date of the user, an age of the user, a sex of the user, a picture of the user, a country that issued the identification, an indication of a type of identification that the identification belongs to, a country where the user is a citizen, or a country where the user has a visa.

In some implementations, scanning the identification of the user includes scanning a passport of the user or retrieving identification information from an electronic identification application.

In some implementations, scanning the identification of the user includes obtaining, through a camera of the computing device, one or more images of the identification, and retrieving the information corresponding to the user comprises: performing text recognition on the one or more images of the identification; and based on the performance, retrieving text, where the information corresponding to the user includes the text.

In some implementations, the method scanning the identification of the user comprises: sending, through a radio-frequency identification reader of the computing device, a signal to a radio-frequency identification tag on the identification; and receiving a response from the radio-frequency identification tag, and retrieving the information corresponding to the user includes retrieving the information from the response.

In some implementations, the method includes: determining a profile status of the user; and transmitting an indication of the profile status of the user to the access control system.

In some implementations, the determining the profile status of the user includes determining that the profile status of the user is void based on the information, and transmitting the indication of the profile status of the user to the access control system includes transmitting to the access control system an indication that the profile status of the user is void.

In some implementations, determining the profile status of the user is void includes determining that the information indicates that the identification is expired.

In some implementations, the method further includes receiving, from the access control system, data indicating that the user is not permitted to travel across the geographic boundary, where determining the profile status of the user includes determining that the profile status of the user is void based on the data indicating that the user is not permitted to travel across the geographic boundary, and where transmitting the indication of the profile status of the user to the access control system includes transmitting to the access control system an indication that the profile status of the user is void.

In some implementations, the data indicates that the user is permitted to be in a first country corresponding to the geographic boundary, and is not permitted to be in a second country corresponding to the geographic boundary.

In some implementations, the method further includes: flagging a profile of the user; and transmitting to the access control system an indication of one or more flags corresponding to the profile.

In some implementations, flagging the profile of the user comprises: based on the information, determining at least one of that the identification of the user is set to expire in a threshold amount of time, a visa of the user has expired, or a visa of the user is set to expire in a threshold amount of time; and associating the one or more determinations with the profile of the user as one or more flags.

In some implementations, the method further includes receiving, from a computing system that is a third party with respect to the computing device and the access control system, data corresponding to the user, where flagging a profile of the user comprises: based on the data, determining at least one of that the user has been charged with a crime in a country corresponding to the geographic boundary, the user has been convicted of a crime in a country corresponding to the geographic boundary, there is an active arrest warrant for the user in a country, the user is on a no fly list of a country, the user has been barred or excluded from a country, or the user has previously unlawfully entered a country; and associating the one or more determinations with the profile of the user as one or more flags.

In some implementations, determining that the user is proximate to a geographic boundary comprises, based on the location data, determining that the computing device is a threshold distance from the geographic boundary.

In some implementations, determining that the user is proximate to a geographic boundary comprises: determining, based on the location data, that the computing device is a first threshold distance from the geographic boundary; obtaining new location data; and based on the new location data, determining that the computing device is moving towards the geographic boundary, or determining that the computing device is a second threshold distance from the geographic boundary or from a checkpoint of the geographic boundary, where the second threshold distance is less than the first threshold distance.

In some implementations, the method further includes: receiving data from the access control system indicating a specified location for the user to move to or for the user to remain at; obtaining new location data; based on the new location data, determining that the user is not at the specified location and is noncompliant, or determining that the user is at the specified location and is compliant; generate a notification indicating that the user is noncompliant or is compliant; transmitting the notification to the access control system.

In some implementations, the access control system is a physical access control system configured to raise and lower one or more barriers.

In some implementations, the access control system includes a traffic management system configured to change one or more traffic patterns.

In some implementations, the access control system includes a pedestrian entrance control system configured to lock and unlock one or more pedestrian gates.

In another general aspect, a method is performed by one or more computing devices. In some implementations, the method includes: receiving location data corresponding to a user and information corresponding to the user; based on the location data, determining, by the one or more computing devices, that the user is proximate to a geographic boundary; accessing, by the one or more computing devices, a list of unauthorized users; comparing, by the one or more computing devices, the information corresponding to the user with the list of unauthorized users; based on the comparison, determining, by the one or more computing devices, that the user is on the list of unauthorized users or is not on the list of unauthorized users; determining, by the one or more computing devices, that the user is permitted to cross the geographic boundary or is not permitted to cross the geographic boundary; and perform, by the one or more computing devices, one or more actions.

In some implementations, the user is transporting a shipment of goods, and the method further includes: receiving information corresponding to the shipment, the information corresponding to the shipment indicating the goods in the shipment; accessing, by the one or more computing devices, a list of unauthorized goods; comparing the information corresponding to the shipment with the list of unauthorized goods; and based on the comparison, determining that one or more of the goods in the shipment are on the list of unauthorized goods or that all the goods in the shipment are not on the list of unauthorized goods; and determining that the shipment is permitted to cross the geographic boundary or is not permitted to cross the geographic boundary.

In some implementations, the one or more actions include raising or lowering a physical barrier at the geographic boundary.

In some implementations, the one or more actions include changing a pattern of traffic proximate to the geographic boundary.

In some implementations, the one or more actions include locking or unlocking a pedestrian gate at the geographic boundary.

In some implementations, a method includes scanning a passport belonging to a user; based on the scan, receiving information associated with the user; registering the user with the information associated with the user; receiving a location of the user; determining that a user is at an international boundary; and reporting the user's location to at least one of a physical access control system, a traffic management system, or pedestrian entrance control system.

In some implementations, scanning the passport includes, through a camera of a mobile device, obtaining an image of the passport; performing text recognition on the image of the passport; based on the performance, obtaining text. Where the information associated with the user is the obtained text.

In some implementations, scanning the passport includes, through a mobile device having a radio-frequency identification reader, sending a signal to a radio-frequency identification tag on the passport; receiving a response from the radio-frequency identification tag. Where the information associated with the user is contained within the received response.

In some implementations, the method also includes reporting the information associated with the user to at least one of a one of the physical access control system, the traffic management system, or the pedestrian entrance control system.

In some implementations, the method also includes determining a registration status of the user; and reporting the registration status of the user to at least one of a one of the physical access control system, the traffic management system, or the pedestrian entrance control system.

In some implementations, the method also includes determining that the user is permitted to cross the international boundary; and sending a message to the user that they are permitted to cross the international boundary.

In some implementations, determining that the user is permitted to cross the international boundary comprises receiving a response to the reported information from at least one of the physical access control system, the traffic management system, or the pedestrian entrance control system indicating that the user is permitted to cross the international boundary.

In some implementations, the method also includes determining that the user is not permitted to cross the international boundary; and sending a message to the user that they are not permitted to cross the international boundary.

In some implementations, determining that the user is permitted to cross the international boundary comprises receiving a response to the reported information from at least one of the physical access control system, the traffic management system, or the pedestrian entrance control system indicating that the user is not permitted to cross the international boundary.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 4 is a diagram showing an example profile of a shipment.

Like reference numbers and designations in the various drawings indicate like elements.

DETAILED DESCRIPTION

Figure 1A:
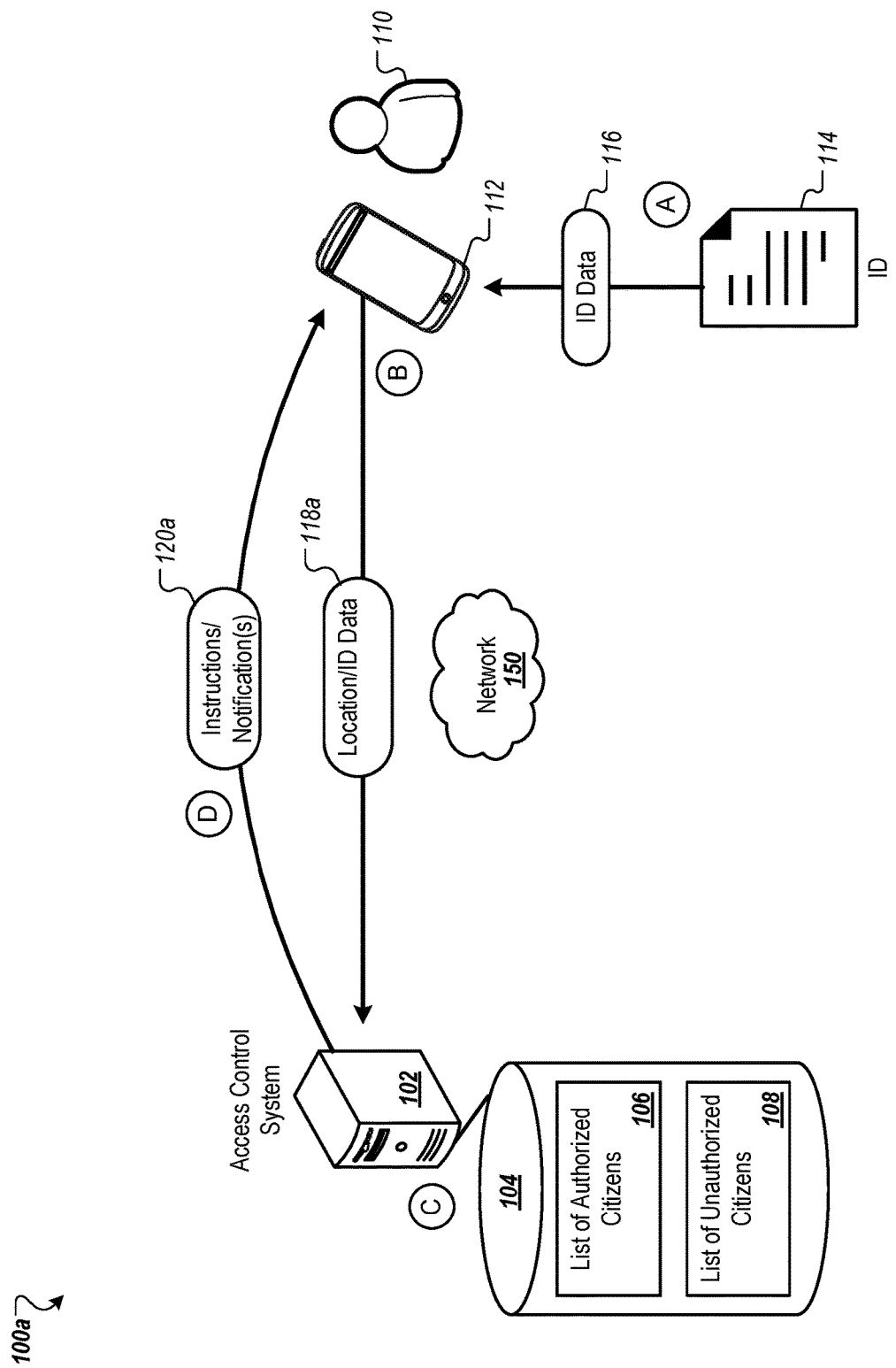
FIG. 1A is a diagram showing an example of system for managing geospatial boundaries.
Figure 1B:
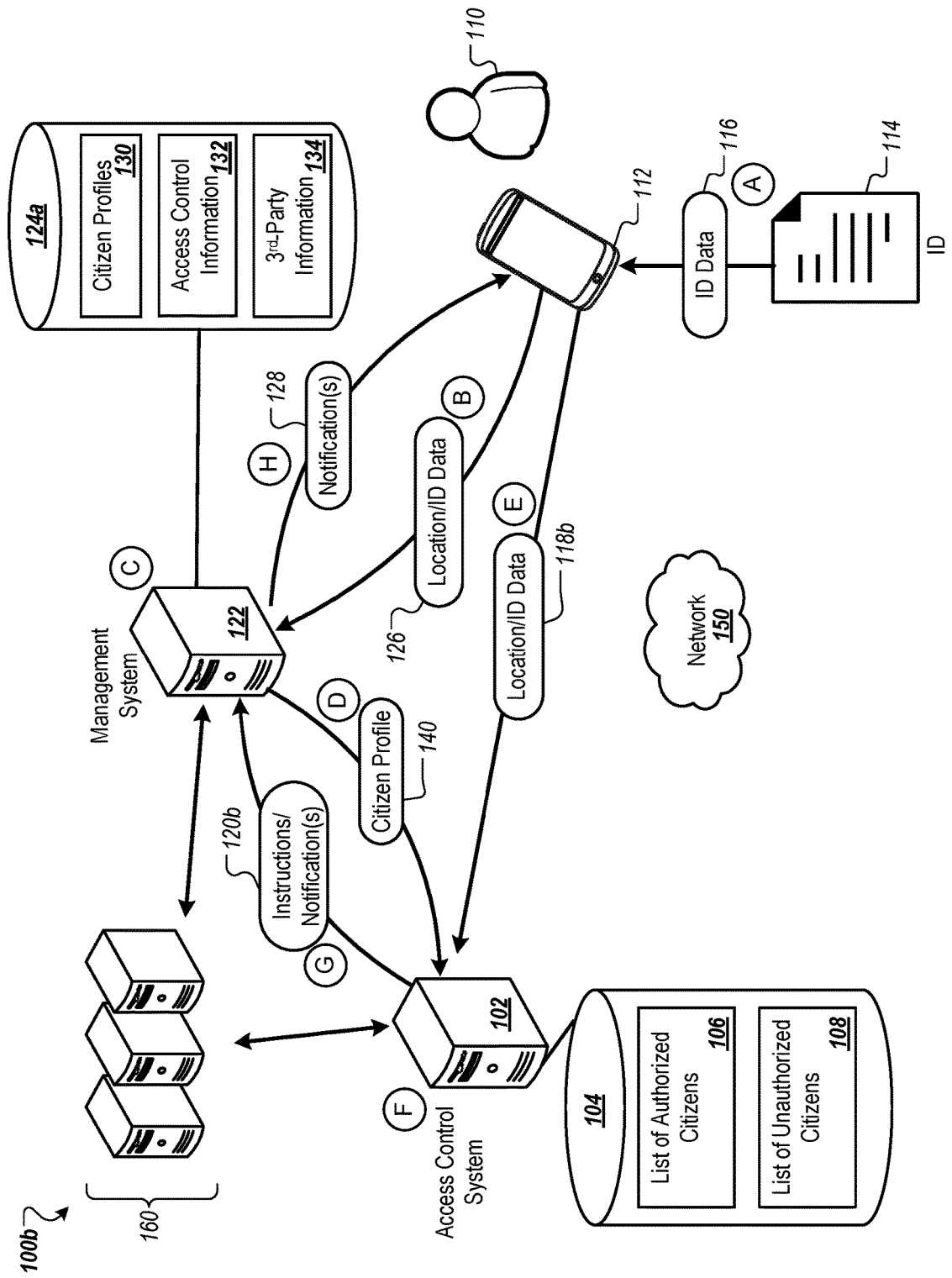
FIG. 1B is a diagram showing an example of system for managing geospatial boundaries.
Figure 2:
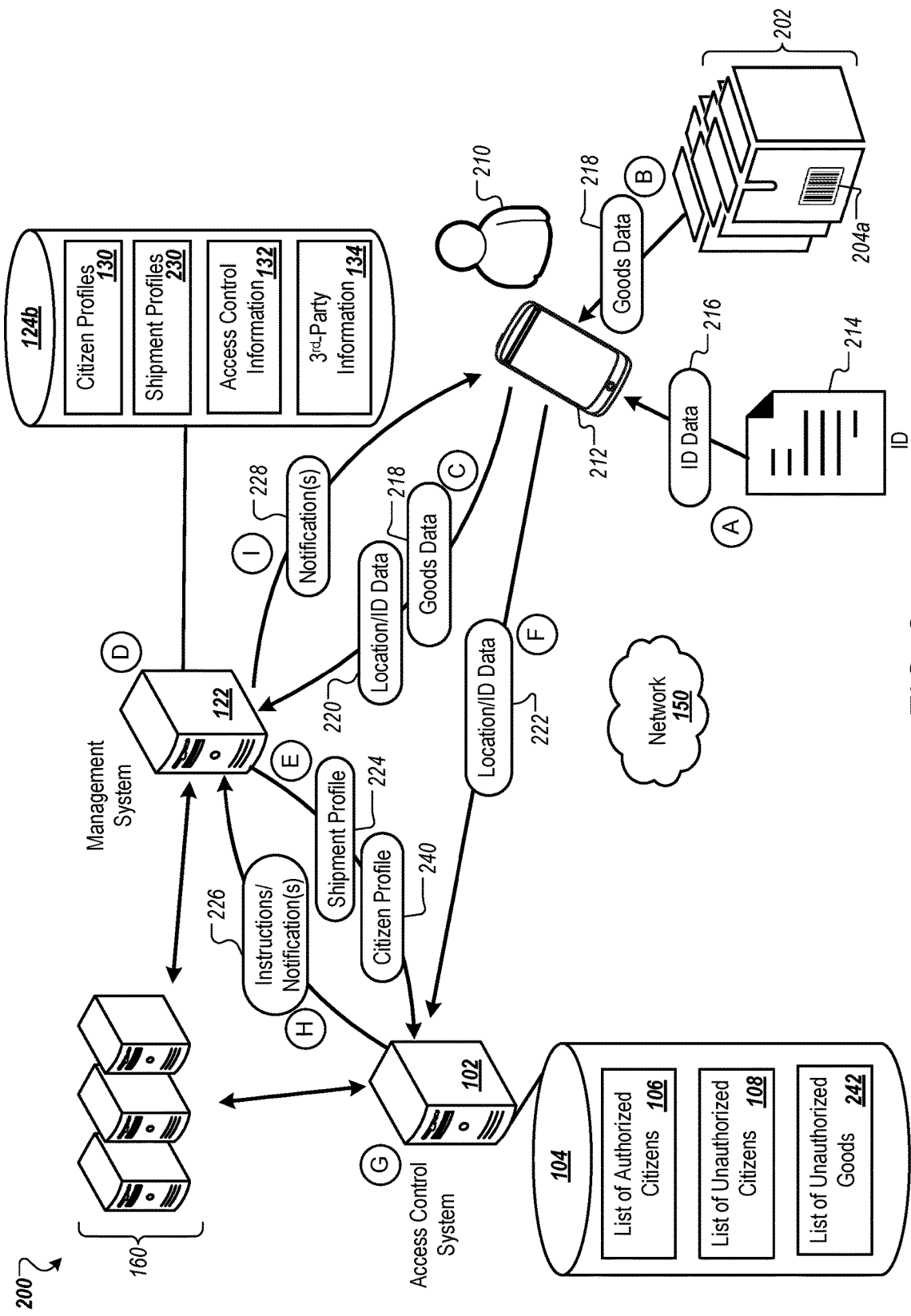
FIG. 2 is a diagram showing an example of system for managing geospatial boundaries.

FIGS. 1A-1B and FIG. 2 are diagrams showing example systems for managing geospatial boundaries. These disclosed systems use a smartphone-based application to link a user's identification (ID) such as a passport and facilitates the user's crossing of an international boundary. The smartphone-based application and/or a management system that manages the smartphone-based application may communicate with one or more existing access control systems, such as one or more physical access control systems (PACS), traffic management systems (TMS), and/or pedestrian entrance control systems (PECS) of an international border in order to grant or deny access to the user. The smartphone-based application and/or a management system may additionally or alternatively communicate with one or more computer systems belonging to immigration agencies. These systems may allow for the denial and/or the facilitation of persons and goods across international borders. These systems may also assist in locating and identifying the persons and goods who have crossed an international border unlawfully.

The disclosed methods and systems provide a solution to issues surrounding border control and existing border control systems. For example, the Irish border is perhaps the most contentious issue in the Brexit negotiations, but using smartphones in the new and unique disclosed herein can help to resolve at least some of the issues faced by the Irish and British governments. One of the notable problems with the Irish Border is that there no physical deterrent at the border and it is the goal of both countries to make the Irish border an "invisible" border. Unfortunately, "invisible" borders are particularly susceptible to illegal crossings of persons and goods.

The techniques disclosed herein could help both the Irish and British governments more efficiently keep track of and/or deny entrance to persons and goods crossing their borders without the need for large, high maintenance, and/or time-consuming to create physical deterrents, such as border walls. For example, each of the governments could require their at least some of their citizens to download a border security application such as the one described in more detail below. This application could provide location and/or identifying data of the user and/or corresponding goods to the border control agencies of the British and/or Irish governments or to a joint agency formed by the British and Irish governments to administer the Irish border, e.g., when the user is approaching the Irish border or is within a certain threshold distance from the Irish border. For example, the location and/or identifying data may be automatically sent to a PACS, TMS, or PECS established by the one or more agencies. The PACS, TMS, or PECS may use the received data to determine if the user and/or corresponding goods are permitted to cross the border and, if not, to efficiently intervene to prevent the user and/or corresponding goods from crossing the border. In cases where an unauthorized user and/or unauthorized goods get past the border, the PACS, TMS, or PECS may use the received data to notify one or more agencies of the country in which the user is currently located, such as notifying the Border Force when it has determined that the user has illegally entered the United Kingdom or has entered the United Kingdom with unlawful goods.

Anyone with a passport issued by the United Kingdom or a European Union state could register using the smartphone application by scanning that passport. Registration would be immediate but could only be done in Northern Ireland or the Republic of Ireland. In some implementations, citizens of other countries could also be allowed to register.

The techniques disclosed herein could also help improve the efficiency and effectiveness of traditional, e.g., non-invisible, borders as well as invisible borders. For example, the system would allow for the early identification of unauthorized users who are approaching and/or are within a threshold distance from a border crossing or a border checkpoint. The system may send instructions to the individual through the border security application to perform a specific action, e.g., to move to a certain location and wait, and may perform additional actions such as directing one to two border control officers to the specified location. This provides numerous benefits, such effectively separating suspect individuals from other, non-suspect individuals, which, in turn, helps to avoid delays in travel across the border. The system may further determine if the individual is compliant with the instructions. For example, if the individual does not move to the specified location, the system may determine that the individual is non complaint and, based on this, may perform other actions. For example, the system may send an alert of noncompliance to direct multiple border control officers to the individual's current location. By determining if an individual is compliant or non-compliant before the border control officers arrive, safety of the border control officers can be improved as the system may provide them some indication of whether the individual is compliant or not.

As will be described in more detail below, the smartphone application can access the location of the device and can report to an access control system when a user of the application is approaching an international border, is at an international border, and/or has crossed an international border.

As will be described in more detail below, in some implementations, authorized users of the smartphone application may be able to avoid all or some of the security checks at an international border. This trust relationship between the mobile application, or an external management system that manages the mobile application, and an access control system would further improve the efficiency of administering border control. In order to motivate citizens to use the smartphone application or to ensure that they do, countries may decide to implement criminal penalties against citizens for not enabling the smartphone application, not registering with the smartphone application, not having their smartphone when crossing the border and not reporting to the authorities, or the like.

As will be described in more detail below with respect to FIG. 6, the smartphone application would contain a declaration option to allow customs declaration and could process payments as with any e-commerce application.

The various systems and subsystems described herein would also maintain all information confidentially and would only report to the governments of the relevant countries, e.g., Ireland and UK, at border crossings and declarations. Information that is to be transmitted to different parts of the systems and subsystems described herein may be encrypted prior to transmission in order to maintain confidentiality.

FIGS. 1A-1B are diagrams showing examples of systems for managing geospatial boundaries.

FIG. 1A shows a first embodiment of a system 100*a* for administering border control. The system 100*a* includes an access control system 102 and a user device 112 of a user 110. The user 110 may be a citizen of a country attempting to cross an international border.

FIG. 1A also illustrates a flow of data, shown as stages (A) to (D), with each representing a step in an example process. Stages (A) to (D) may occur in the illustrated sequence, or in a sequence that is different from the illustrated sequence. For example some of the stages may occur concurrently.

The access control system 102 may include one or more computing devices such as one or more servers, desktop computers, laptop computers, or the like. The access control system 102 may be a PACS, a TMS, and/or a PECS of an international border in order to grant or deny access to the user 110. The access control system 102 may correspond to a particular border, a particular part of a border, or a particular checkpoint of a border. The access control system 102 may correspond to a particular country. The access control system 102 may correspond to a particular agency, such as a border control agency of a country or a joint agency of multiple countries. The access control system 102 includes a data store 104.

The data store 104 stores a list 106 of authorized citizens and a list 108 of unauthorized citizens. The access control system 102 may update the lists 106 and 108 over time and/or as new information becomes available. In some implementations, the data store 104 only includes the list 108 of unauthorized citizens. As will be described in more detail below with respect to FIG. 1B, the access control system 102 may generate the list 106 and/or the list 108 using data received from third-party systems, such as computer systems and servers of government agencies. For example, the access control system 102 may generate or update the list 108 using individuals found on a no-fly list obtained from a TSA server. Similarly, the access control system 102 may generate the list 106 using data received from third-party systems, such as computer systems and servers of government agencies. For example, the access control system 102 may generate or update the list 106 using individuals who are identified as US congressman based on data obtained from one or more federal government servers.

The data store 104 may also include multiple lists of unauthorized citizens. For example, the list 108 may correspond to a particular country (e.g., only one of the two countries of an international border), e.g., the list 108 indicates the citizens that are not authorized to enter a first country. The data store 104 may also include a second list of unauthorized citizens for those who are not authorized to enter the second country. Similarly, the data store 104 may also include multiple lists of authorized citizens.

The user device 112 may be a mobile phone, a smart phone, a personal digital assistants (PDA), or a tablet computer. In some implementations, the user device 112 is a laptop computer. The user device 112 may include an onboard camera. The user device 112 may include an onboard radio-frequency identification reader. The user device 112 may include a GPS unit. The user device 112 can communicate with the access control system 102 over a network 150.

The network 150 can include public and/or private networks and can include the Internet.

At stage A, the user 110 uses the user device 112 to retrieve identification (ID) data 116 from the ID 114. The ID 114 may be, for example, a passport, visa, or license issued by a country. The ID data 116 may be retrieved by using a camera of the user device 112 to capture one or more pictures of the ID 114. The ID data 116 may be retrieved by using a radio-frequency identification reader. For example, the user device 112 may send a signal to a radio-frequency identification tag of the ID 114 through the radio-frequency identification reader of the user device 112. The user device 112 would then receive a response from the radio-frequency identification tag of the ID 114. This response would be the ID data 116.

The response may include information associated with the user 110. For example, the response may indicate a name of the user 110, an identification number corresponding to the user 110, an address of the user 110, a date that the ID 114 was issued, a date that the ID 114 is set to expire, a birth date of the user 110, an age of the user 110, a sex of the user 110, a picture of the user 110, an indication of a type of identification that the ID 114 belongs to (e.g., passport or visa), a country that issued the ID 114, a country where the user is a citizen, or a country where the user has a visa. The user device 112 may proceed to extract this information from the ID data 116. The user device 112 may use the ID data 116, or information extracted from the ID data 116, to form or generate the location/ID data 118a.

If the ID data 116 was retrieved using a camera, the user device 112 may perform text recognition on the collected images of the ID 114 in order to extract information associated with the user 110. This information may include, for example, a name of the user 110, an identification number corresponding to the user 110, an address of the user 110, a date that the ID 114 was issued, a date that the ID 114 is set to expire, a birth date of the user 110, an age of the user 110, a sex of the user 110, a picture of the user 110, an indication of a type of identification that the ID 114 belongs to (e.g., passport, visa, or license), a country that issued the ID 114, a country where the user is a citizen, or a country where the user has a visa. Additionally, the user device 112 may perform other types of image recognition. For example, the user device 112 may identify and extract a picture of the user 110 in the ID 114. The user device 112 may make the data extracted from the ID data 116 all or part of the location/ID data 118a.

If the ID data 116 was retrieved using a radio-frequency identification reader, the user device 112 may perform text recognition on the collected images of the ID 114 in order to extract information associated with the user. This information may include, for example, a name of the user 110, an identification number corresponding to the user 110, an address of the user 110, a date that the ID 114 was issued, a date that the ID 114 is set to expire, a birth date of the user 110, an age of the user 110, a sex of the user 110, a picture of the user 110, an indication of a type of identification that the ID 114 belongs to (e.g., passport, visa, or license), a country that issued the ID 114, a country where the user is a citizen, or a country where the user has a visa. Additionally, the user device 112 may perform other types of image recognition. For example, the user device 112 may identify and extract a picture of the user 110 in the ID 114. The data extracted from the ID data 116 may be made part of the location/ID data 118a.

At stage B, the user device 112 generates the location/ID data 118a and transmits it to the access control system 102. The location/ID data 118a may include the information extracted from the ID data 116. In some implementations, the location/ID data 118a includes the ID data 116. The user device 112 also obtains location data using, for example, output from a GPS unit of the user device 112. The user device 112 may transmit the location/ID data 118a as a data package to the access control system 102. Alternatively, the user device 112 may send ID data to the access control system 102 a single time and continuously or periodically send location data.

Sending the location/ID data 118a may be triggered by the user device 112. For example, the user device 112 may determine based on output from an onboard GPS unit that the user 110 is approaching an international border, is at an international border, has crossed an international border, is within a threshold distance from the international border, or is within a threshold distance from a checkpoint of the international border. The user device 112 may compare the output of the GPS unit to mapping data in order to make these determinations. If any of these determinations are made by the user device 112, the user device 112 may automatically send the location/ID data 118*a* to the access control system 102 in response to making the determination.

Sending the location/ID data 118*a* to the access control system 102 may be in response to a request from the access control system 102. For example, the access control system 102 may get periodic location updates from a mobile application running the user device 112. If the access control system 102 determines that the user 110 is approaching an international border, is at an international border, has crossed an international border, is within a threshold distance from the international border, or is within a threshold distance from a checkpoint of the international border based on these periodic location updates, the access control system 102 may send a request to the user device 112 over the network 150. The location/ID data 118*a* may be sent by the user device 112 in response to receiving the request. The request may also provide instructions, such as instructions to the user device 112 to increase the rate at which location updates are to be sent to the access control system 102, to stream the location of the user device 112 to the access control system 102, or the like.

At stage C, the access control system 102 may use the received location/ID data 118*a* to determine where the user 110 is in relation to an international border, and/or to determine if the user 110 is permitted to cross the international border and/or the level of security measures that should be raised against the user 110. For example, the access control system 102 may use the location/ID data 118*a* to determine that the user 110 is approaching an international border, is at an international border, has crossed an international border, is within a threshold distance from the international border, is within a threshold distance from a checkpoint of the international border, or the like. The access control system 102 may make these determinations by, for example, comparing location data corresponding to the user device 112 in the location/ID data 118*a* to stored mapping data.

The access control system 102 may also determine if the user 110 is permitted to cross the international border, and/or the level of security measures that should be raised against the user 110. In making this determination, the access control system 102 may compare the ID data in the location/ID data 118*a* to the lists 106 and/or 108. If the user 110 is identified on the list 108, the access control system 102 may determine that the user 110 is not permitted to cross the international border, and/or may determine that the level of security measures should be raised against the user 110. If the user 110 is identified on the list 106, the access control system 102 may determine that the user 110 is permitted to cross the international border, and/or may determine that the level of security measures should be lowered for the user 110. If the user 110 is found on both lists 106 and 108, the access control system 102 may determine that further consideration of the user 110 is required. For example, the access control system 102 may request that an administrator review the discrepancy and confirm whether the user 110 should or should not be allowed to cross the border. Alternatively, the access control system 102 may allow the user 110 to proceed through normal security as opposed to increased security measures as would be the case if the user 110 was determined to be unauthorized, or decreased security measures as would be the case if the user 110 was determined to be authorized.

Depending on the determinations made, the access control system 102 may generate one or more notifications and instructions to be sent to various external devices. One or more of these generated notifications and instructions may be made part of, by the access control system 102, instructions/notification(s) 120*a*. For example, the access control system 102 may generate a notification for the user 110 that they are not permitted to cross the border and to stop their vehicle. The access control system 102 may also generate instructions for the user device 112 to start sending location data to the access control system 102 at a faster rate.

Depending on the determinations made and the type of access control system that that the access control system 102 is, the access control system 102 may perform one or more actions. For example, if the access control system 102 determines that the user 110 is unauthorized (e.g., is not permitted to enter country A, or is not permitted to leave country B) and if the access control system 102 is a PACS, then the access control system 102 may raise one or more barriers, such as one or more road barriers, to prevent the user 110 from crossing the international boundary. If the access control system 102 determines that the user 110 is unauthorized (e.g., is not permitted to enter country A, or is not permitted to leave country B) and if the access control system 102 is a TMS, then the access control system 102 may divert traffic or change traffic patterns in order to bring the user 110 to a certain area, to keep the user 110 at a certain area, to move other citizens away from the user 110, and/or to provide an avenue for personnel to quickly intercept the user 110. The access control system 102 may accomplish this by closing lanes of traffic through a checkpoint, opening lanes of traffic through a checkpoint, closing a lane, opening a lane, manipulating traffic lights to encourage various actions, or the like. If the access control system 102 determines that the user 110 is unauthorized (e.g., is not permitted to enter country A, or is not permitted to leave country B) and if the access control system 102 is a PECS, then the access control system 102 may lock or otherwise disable one or more pedestrian gates to prevent the user 110 from gaining access, or may manipulate the predestination gates to divert pedestrian traffic or change pedestrian traffic patterns in order to bring the user 110 to a certain area, to keep the user 110 at a certain area, to move other citizens away from the user 110, and/or to provide an avenue for personnel to quickly intercept the user 110.

Similarly, if the access control system 102 determines that the user 110 is authorized (e.g., is permitted to enter country A, and/or is permitted to leave country B) and if the access control system 102 is a PACS, then the access control system 102 may lower one or more barriers, such as one or more road barriers, to facilitate the user 110 crossing the international boundary, e.g., to speed up their entry into country A. If the access control system 102 determines that the user 110 is authorized (e.g., is permitted to enter country A, and/or is permitted to leave country B) and if the access control system 102 is a TMS, then the access control system 102 may divert traffic or change traffic patterns in order to bring the user 110 to a checkpoint faster, or to bring the user to an auxiliary checkpoint for those who have been determined to be authorized. The access control system 102 may accomplish this by opening lanes of traffic through a checkpoint, opening a lane, manipulating traffic lights to encourage various actions, or the like. If the access control system 102 determines that the user 110 is authorized (e.g., is permitted to enter country A, and/or is permitted to leave country B) and if the access control system 102 is a PECS, then the access control system 102 may unlock or otherwise enable one or more pedestrian gates to facilitate the user 110 gaining access, or may manipulate the predestination gates to divert pedestrian traffic or change pedestrian traffic patterns in order to provide the user 110 access more quickly, to move other citizens away from the user 110, or to move the user 110 to an fast track gate for those who were determined to be authorized.

At stage D, the access control system 102 sends instructions/notification(s) 120a to the user device 112.

FIG. 1B shows a second embodiment of a system 100b for administering border control. The system 100b includes the access control system 102, the user device 112 of a user 110, and a management system 122. The management system 122 and the access control system 102 may be able to communicate with one or more third-party computing systems or servers 160.

FIG. 1B also illustrates a flow of data, shown as stages (A) to (H), with each representing a step in an example process. Stages (A) to (H) may occur in the illustrated sequence, or in a sequence that is different from the illustrated sequence. For example some of the stages may occur concurrently.

The management system 122 can include one or more computing devices. The management system 122 can include a server or be part of a server system. The management system 122 can be part of a cloud computing platform (e.g., Amazon Web Services (AWS), Microsoft Azure, and so on). The management system 122 may store in its data store 124a download and installation files for a border security application that is installed on the user device 112. In some implementations, the management system 122 is part of the access control system 102. The data store 124a may be part of the data store 104. In some implementations, the management system 122 is on the computing device 112. The data store 124 may be the data storage of the user device 112 or may be part of the data storage of the user device 112.

The data store 124a includes citizen profiles 130, access control information 132, and $3^{rd}$-party information 134. As will be discussed in more detail below, the management system 122 may generate and store the citizen profiles 130 based on ID data obtained from users. The access control information 132 may be acquired by the management system 122 from the access control system 102 and may include part or all of the lists 106 and/or 108, e.g., depending on a level of trust existing between the access control system 102 and the management system 122. The $3^{rd}$-party information 134 may be acquired by the management system 122 from the third-party computing systems or servers 160.

The third-party computing systems or servers 160 (remote systems 160) may include the computing systems or servers of one or more agencies of a country's government. For example, the remote systems 160 may include one or more, or multiples of the following: a computing system of a border control agency of a country, of a law enforcement agency of a country, a transportation agency, a traffic server of a country, a joint agency of multiple countries, or the like. The access control system 102 and/or the management system 122 may obtain from the remote systems 160 information relevant to the user 110, such as, for example, criminal arrest records of the user 110, criminal conviction records of the user 110, immigration records of the user 110, citizenship records of the user 110, no-fly lists, or the like. This information may indicate, for example, whether the user 110 has recently been arrested in a particular country, if there is an arrest warrant for the user 110 in a particular country, if the user 110 is not permitted to travel to or from a particular country, if the user 110 has committed a felony, if the user 110 has previously attempted to enter a country or a particular country unlawfully, if the user 110 has previously entered a country or a particular country unlawfully, if the user if the user 110 has been banned from a country or a particular country, or the like. This information collected by the management system 122 may be stored by the management system 122 in its data store 124a as $3^{rd}$-party information 134.

At stage A, the user 110 uses the user device 112 to retrieve identification (ID) data 116 from the ID 114. The ID 114 may be, for example, a passport, visa, or license issued by a country. The ID data 116 may be retrieved by using a camera of the user device 112 to capture one or more pictures of the ID 114. The ID data 116 may be retrieved by using a radio-frequency identification reader. For example, the user device 112 may send a signal to a radio-frequency identification tag of the ID 114 through the radio-frequency identification reader of the user device 112. The user device 112 would then receive a response from the radio-frequency identification tag of the ID 114. This response would be the ID data 116.

The response may include information associated with the user 110. For example, the response may indicate a name of the user 110, an identification number corresponding to the user 110, an address of the user 110, a date that the ID 114 was issued, a date that the ID 114 is set to expire, a birth date of the user 110, an age of the user 110, a sex of the user 110, a picture of the user 110, an indication of a type of identification that the ID 114 belongs to (e.g., passport or visa), a country that issued the ID 114, a country where the user is a citizen, or a country where the user has a visa. The user device 112 may proceed to extract this information from the ID data 116. The user device 112 may use the ID data 116, or information extracted from the ID data 116, to form or generate the location/ID data 126 and/or the location/ID data 118b.

If the ID data 116 was retrieved using a camera, the user device 112 may perform text recognition on the collected images of the ID 114 in order to extract information associated with the user 110. This information may include, for example, a name of the user 110, an identification number corresponding to the user 110, an address of the user 110, a date that the ID 114 was issued, a date that the ID 114 is set to expire, a birth date of the user 110, an age of the user 110, a sex of the user 110, a picture of the user 110, an indication of a type of identification that the ID 114 belongs to (e.g., passport, visa, or license), a country that issued the ID 114, a country where the user is a citizen, or a country where the user has a visa. Additionally, the user device 112 may perform other types of image recognition. For example, the user device 112 may identify and extract a picture of the user 110 in the ID 114. The user device 112 may make the data extracted from the ID data 116 all or part of the location/ID data 118a.

If the ID data 116 was retrieved using a radio-frequency identification reader, the user device 112 may perform text recognition on the collected images of the ID 114 in order to extract information associated with the user. This information may include, for example, a name of the user 110, an identification number corresponding to the user 110, an address of the user 110, a date that the ID 114 was issued, a date that the ID 114 is set to expire, a birth date of the user 110, an age of the user 110, a sex of the user 110, a picture of the user 110, an indication of a type of identification that the ID 114 belongs to (e.g., passport, visa, or license), a country that issued the ID 114, a country where the user is a citizen, or a country where the user has a visa. Additionally, the user device 112 may perform other types of image recognition. For example, the user device 112 may identify and extract a picture of the user 110 in the ID 114. The data extracted from the ID data 116 may be made part of the location/ID data 118a.

At stage B, the user device 112 generates the location/ID data 126 and transmits it to the management system 122. The location/ID data 126 may include the information extracted from the ID data 116. In some implementations, the location/ID data 126 includes the ID data 116. The user device 112 also obtains location data using, for example, output from a GPS unit of the user device 112. The user device 112 may transmit the location/ID data 126 as a data package to the management system 122. Alternatively, the user device 112 may send ID data to the management system 122 a single time and continuously or periodically send location data.

Sending the location/ID data 126 may be triggered by the user device 112. For example, the user device 112 may determine based on output from an onboard GPS unit that the user 110 is approaching an international border, is at an international border, has crossed an international border, is within a threshold distance from the international border, or is within a threshold distance from a checkpoint of the international border. The user device 112 may compare the output of the GPS unit to mapping data in order to make these determinations. If any of these determinations are made by the user device 112, the user device 112 may automatically send the location/ID data 126 to the management system 122 in response to making the determination.

Sending the location/ID data 126 to the access control system 102 may be in response to a request from the management system 122. For example, the management system 122 may get periodic location updates from a mobile application running the user device 112. If the management system 122 determines that the user 110 is approaching an international border, is at an international border, has crossed an international border, is within a threshold distance from the international border, or is within a threshold distance from a checkpoint of the international border based on these periodic location updates, the management system 122 may send a request to the user device 112 over the network 150. The location/ID data 126 may be sent by the user device 112 in response to receiving the request. The request may also provide instructions, such as instructions to the user device 112 to increase the rate at which location updates are to be sent to the management system 122, to stream the location of the user device 112 to the management system 122, or the like.

At stage C, the management system 122 may use the received location/ID data 126 to determine where the user 110 is in relation to an international border, and/or to determine if the user 110 is permitted to cross the international border. For example, the management system 122 may use the location/ID data 126 to determine that the user 110 is approaching an international border, is at an international border, has crossed an international border, is within a threshold distance from the international border, is within a threshold distance from a checkpoint of the international border, or the like. The management system 122 may make these determinations by, for example, comparing location data corresponding to the user device 112 in the location/ID data 126 to stored mapping data.

The management system 122 may also generate a citizen profile 140 for the user 110 based on the ID data and/or the location data in the location/ID data 126. The management system 122 may store the citizen profile 140 in the data store 124a as part of the citizen profiles 130. As will be described in more detail with respect to FIG. 3, the citizen profile 140 may include, for example, countries that the user 110 is affiliated with (e.g., is a citizen of or has a visa with), a profile status, recent events such as approaching an international border, and profile flags such as a visa or passport expiring soon.

At stage D, the management system 122 sends, e.g., transmits, the citizen profile 140 to the access control system.

Optionally, at stage E, the user device 112 generates the location/ID data 118b and transmits it to the access control system 102. In some implementations, the location/ID data 118b is the location/ID data 126.

In some implementations, the user device 112 does not directly send the location and ID data to the access control system 102. Instead, the management system 122 may pass along some or all of the location/ID data 126 to the access control system 102, e.g., depending on a level of trust existing between the management system 122 and the access control system 102.

At stage F, the access control system 102 determines if the user 110 is permitted to cross the international border, and/or the level of security measures that should be raised against the user 110. In making this determination, may compare information contained in the citizen profile 140 to the lists 106 and/or 108. Alternatively or additionally, in making this determination, the access control system 102 may compare the ID data in the location/ID data 118b to the lists 106 and/or 108. If the user 110 is identified on the list 108, the access control system 102 may determine that the user 110 is not permitted to cross the international border, and/or may determine that the level of security measures should be raised against the user 110. If the user 110 is identified on the list 106, the access control system 102 may determine that the user 110 is permitted to cross the international border, and/or may determine that the level of security measures should be lowered for the user 110. If the user 110 is found on both lists 106 and 108, the access control system 102 may determine that further consideration of the user 110 is required. For example, the access control system 102 may request that an administrator review the discrepancy and confirm whether the user 110 should or should not be allowed to cross the border. Alternatively, the access control system 102 may allow the user 110 to proceed through normal security as opposed to increased security measures as would be the case if the user 110 was determined to be unauthorized, or decreased security measures as would be the case if the user 110 was determined to be authorized.

Depending on the determinations made, the access control system 102 may generate one or more notifications and instructions to be sent to various external devices. One or more of these generated notifications and instructions may be made part of, by the access control system 102, instructions/notification(s) 120b. For example, the access control system 102 may generate a notification for the user 110 that they are not permitted to cross the border and to stop their vehicle. The access control system 102 may also generate instructions for the user device 112 to start sending location data to the management system 122 at a faster rate, or instructions for the management system 122 to start requesting location data from the user 112 more frequently.

Depending on the determinations made and the type of access control system that that the access control system 102 is, the access control system 102 may perform one or more actions. For example, if the access control system 102 determines that the user 110 is unauthorized (e.g., is not permitted to enter country A, or is not permitted to leave country B) and if the access control system 102 is a PACS, then the access control system 102 may raise one or more barriers, such as one or more road barriers, to prevent the user 110 from crossing the international boundary. If the access control system 102 determines that the user 110 is unauthorized (e.g., is not permitted to enter country A, or is not permitted to leave country B) and if the access control system 102 is a TMS, then the access control system 102 may divert traffic or change traffic patterns in order to bring the user 110 to a certain area, to keep the user 110 at a certain area, to move other citizens away from the user 110, and/or to provide an avenue for personnel to quickly intercept the user 110. The access control system 102 may accomplish this by closing lanes of traffic through a checkpoint, opening lanes of traffic through a checkpoint, closing a lane, opening a lane, manipulating traffic lights to encourage various actions, or the like. If the access control system 102 determines that the user 110 is unauthorized (e.g., is not permitted to enter country A, or is not permitted to leave country B) and if the access control system 102 is a PECS, then the access control system 102 may lock or otherwise disable one or more pedestrian gates to prevent the user 110 from gaining access, or may manipulate the predestination gates to divert pedestrian traffic or change pedestrian traffic patterns in order to bring the user 110 to a certain area, to keep the user 110 at a certain area, to move other citizens away from the user 110, and/or to provide an avenue for personnel to quickly intercept the user 110.

Similarly, if the access control system 102 determines that the user 110 is authorized (e.g., is permitted to enter country A, and/or is permitted to leave country B) and if the access control system 102 is a PACS, then the access control system 102 may lower one or more barriers, such as one or more road barriers, to facilitate the user 110 crossing the international boundary, e.g., to speed up their entry into country A. If the access control system 102 determines that the user 110 is authorized (e.g., is permitted to enter country A, and/or is permitted to leave country B) and if the access control system 102 is a TMS, then the access control system 102 may divert traffic or change traffic patterns in order to bring the user 110 to a checkpoint faster, or to bring the user to an auxiliary checkpoint for those who have been determined to be authorized. The access control system 102 may accomplish this by opening lanes of traffic through a checkpoint, opening a lane, manipulating traffic lights to encourage various actions, or the like. If the access control system 102 determines that the user 110 is authorized (e.g., is permitted to enter country A, and/or is permitted to leave country B) and if the access control system 102 is a PECS, then the access control system 102 may unlock or otherwise enable one or more pedestrian gates to facilitate the user 110 gaining access, or may manipulate the predestination gates to divert pedestrian traffic or change pedestrian traffic patterns in order to provide the user 110 access more quickly, to move other citizens away from the user 110, or to move the user 110 to an fast track gate for those who were determined to be authorized.

At stage G, the access control system 102 sends the instructions/notification(s) 120*b* to the management system 122.

At stage H, the management system 122 sends notification(s) 128 to the user device 112. The notification(s) 128 may include one or more notifications included in the instructions/notification(s) 120*b*. The notification(s) 128 may include one or more modified versions of notifications included in the instructions/notification(s) 120*b*.

FIG. 2 is a diagram showing an example of system 200 for managing geospatial boundaries. The system 200 includes the access control system 102, a user device 212 of a user 110, and the management system 122. The management system 122 and the access control system 102 may be able to communicate with the remote systems 160.

In some implementations, the system 200 is the system 100*a* shown in FIG. 1A where the management system 122 is part of the access control system 102 or the user device 112. In some implementations, the system 200 is the system 100*b* shown in FIG. 1B.

The user device 212 may be a mobile phone, a smart phone, a personal digital assistants (PDA), or a tablet computer. In some implementations, the user device 212 is a laptop computer. The user device 212 may include an onboard camera. The user device 212 may include an onboard radio-frequency identification reader. The user device 212 may include a GPS unit. The user device 212 can communicate with the access control system 102 over a network 150. In some implementations, the user device 212 is the user device 112 shown in FIGS. 1A-1B.

FIG. 2 also illustrates a flow of data, shown as stages (A) to (I), with each representing a step in an example process. Stages (A) to (I) may occur in the illustrated sequence, or in a sequence that is different from the illustrated sequence. For example some of the stages may occur concurrently.

At stage A, the user 210 uses the user device 212 to retrieve identification (ID) data 216 from the ID 214. The ID 214 may be, for example, a passport, visa, or license issued by a country. The ID data 216 may be retrieved by using a camera of the user device 212 to capture one or more pictures of the ID 214. The ID data 216 may be retrieved by using a radio-frequency identification reader. For example, the user device 212 may send a signal to a radio-frequency identification tag of the ID 214 through the radio-frequency identification reader of the user device 212. The user device 212 would then receive a response from the radio-frequency identification tag of the ID 214. This response would be the ID data 216.

The response may include information associated with the user 210. For example, the response may indicate a name of the user 210, an identification number corresponding to the user 210, an address of the user 210, a date that the ID 214 was issued, a date that the ID 214 is set to expire, a birth date of the user 210, an age of the user 210, a sex of the user 210, a picture of the user 210, an indication of a type of identification that the ID 214 belongs to (e.g., passport or visa), a country that issued the ID 214, a country where the user is a citizen, or a country where the user has a visa. The user device 212 may proceed to extract this information from the ID data 216. The user device 212 may use the ID data 216, or information extracted from the ID data 216, to form or generate the location/ID data 220.

If the ID data 216 was retrieved using a camera, the user device 212 may perform text recognition on the collected images of the ID 214 in order to extract information associated with the user 210. This information may include, for example, a name of the user 210, an identification number corresponding to the user 210, an address of the user 210, a date that the ID 214 was issued, a date that the ID 214 is set to expire, a birth date of the user 210, an age of the user 210, a sex of the user 210, a picture of the user 210, an indication of a type of identification that the ID 214 belongs to (e.g., passport, visa, or license), a country that issued the ID 214, a country where the user is a citizen, or a country where the user has a visa. Additionally, the user device 212 may perform other types of image recognition. For example, the user device 212 may identify and extract a picture of the user 210 in the ID 214. The user device 212 may make the data extracted from the ID data 216 all or part of the location/ID data 118a.

If the ID data 216 was retrieved using a radio-frequency identification reader, the user device 212 may perform text recognition on the collected images of the ID 214 in order to extract information associated with the user. This information may include, for example, a name of the user 210, an identification number corresponding to the user 210, an address of the user 210, a date that the ID 214 was issued, a date that the ID 214 is set to expire, a birth date of the user 210, an age of the user 210, a sex of the user 210, a picture of the user 210, an indication of a type of identification that the ID 214 belongs to (e.g., passport, visa, or license), a country that issued the ID 214, a country where the user is a citizen, or a country where the user has a visa. Additionally, the user device 212 may perform other types of image recognition. For example, the user device 212 may identify and extract a picture of the user 210 in the ID 214. The data extracted from the ID data 216 may be made part of the location/ID data 118a.

At stage B, the user 210 uses the user device 212 to retrieve goods data 218 from packages 202. The goods data 218 may be retrieved using an onboard camera of the user device 212. For example, the user 210 can use the camera of the user device 212 to scan a codes on each of the packages 202 including the code 204a. The code 204a may be a barcode or a QR code. The information retrieved from scanning the codes of each of the packages 202 would be the goods data 218.

The goods data 218 may alternatively be retrieved using a radio-frequency identification reader of the user device 212. For example, the user device 212 may send a signal to radio-frequency identification tags on the packages 202 through the radio-frequency identification reader of the user device 212. The user device 212 would then receive multiple response from the radio-frequency identification tags of the packages. These responses would be the goods data 218.

The goods data 218 may include an indication of the contents of the packages 202, the amount of contents of the packages 202, a shipment itinerary for the packages 202, a source or pick up location for the packages 202, a destination or drop off location for the packages 202, or the like.

At stage C, the user device 212 generates the location/ID data 220 and transmits the location/ID data 220 and the goods data 218 to the management system 122. The location/ID data 220 may include the information extracted from the ID data 216. In some implementations, the location/ID data 220 includes the ID data 216. The user device 212 also obtains location data using, for example, output from a GPS unit of the user device 212. The user device 212 may transmit the location/ID data 220 as a data package to the management system 122. Alternatively, the user device 212 may send ID data to the management system 122 a single time and continuously or periodically send location data.

Sending the location/ID data 220 may be triggered by the user device 212. For example, the user device 212 may determine based on output from an onboard GPS unit that the user 210 is approaching an international border, is at an international border, has crossed an international border, is within a threshold distance from the international border, or is within a threshold distance from a checkpoint of the international border. The user device 212 may compare the output of the GPS unit to mapping data in order to make these determinations. If any of these determinations are made by the user device 212, the user device 212 may automatically send the location/ID data 220 to the management system 122 in response to making the determination.

Sending the location/ID data 220 to the access control system 102 may be in response to a request from the management system 122. For example, the management system 122 may get periodic location updates from a mobile application running the user device 212. If the management system 122 determines that the user 210 is approaching an international border, is at an international border, has crossed an international border, is within a threshold distance from the international border, or is within a threshold distance from a checkpoint of the international border based on these periodic location updates, the management system 122 may send a request to the user device 212 over the network 150. The location/ID data 220 may be sent by the user device 212 in response to receiving the request. The request may also provide instructions, such as instructions to the user device 212 to increase the rate at which location updates are to be sent to the management system 122, to stream the location of the user device 212 to the management system 122, or the like.

At stage D, the management system 122 may use the received location/ID data 220 to determine where the user 210 is in relation to an international border, and/or to determine if the user 210 is permitted to cross the international border. For example, the management system 122 may use the location/ID data 220 to determine that the user 210 is approaching an international border, is at an international border, has crossed an international border, is within a threshold distance from the international border, is within a threshold distance from a checkpoint of the international border, or the like. The management system 122 may make these determinations by, for example, comparing location data corresponding to the user device 212 in the location/ID data 220 to stored mapping data.

The management system 122 may also generate a citizen profile 140 for the user 210 based on the ID data and/or the location data in the location/ID data 220. The management system 122 may store the citizen profile 240 in the data store 124b as part of the citizen profiles 130. As will be described in more detail with respect to FIG. 3, the citizen profile 240 may include, for example, countries that the user 210 is affiliated with (e.g., is a citizen of or has a visa with), a profile status, recent events such as approaching an international border, and profile flags such as a visa or passport expiring soon. The management system 122 may also generate a shipment profile 224 for the packages 202 being delivered by the user 210 based on the goods data 218, and/or the location/ID data 220. The management system 122 may store the shipment profile 224 in the data store 124b as part of the shipment profiles 230. As will be described in more detail with respect to FIG. 4, the shipment profile 224 may include, for example, the itinerary of the shipment, information as to how the shipment is being transported, the contents of the shipment, the amount of contents of the shipment, recent events such as the shipment approaching an international border, and profile flags such as a country banning the importation of one of the contents of the shipment.

At stage E, the management system 122 sends the citizen profile 240 and the shipment profile 224 to the access control system.

Optionally, at stage F, the user device 212 generates the location/ID data 222 and transmits it to the access control system 102. In some implementations, the location/ID data 222 is the location/ID data 220.

In some implementations, the user device 212 does not directly send the location and ID data to the access control system 102. Instead, the management system 122 may pass along some or all of the location/ID data 220 to the access control system 102, e.g., depending on a level of trust existing between the management system 122 and the access control system 102.

At stage G, the access control system 102 determines if the user 210 and/or shipment of packages 202 is permitted to cross the international border, and/or the level of security measures that should be raised against the user 210 and/or the shipment of packages 202. In making this determination, the access control system 102 may compare information contained in the citizen profile 240 to the lists 106 and/or 108, and may compare information contained in the shipment profile 224 to a list of unauthorized goods 242. The list of unauthorized goods 242 may be a list of goods that are banned from importation into a country or a particular country, or a list of goods that are under restricted importation into a country or a particular country. Alternatively or additionally, in making this determination, the access control system 102 may compare the ID data in the location/ID data 222 to the lists 106 and/or 108. If the user 210 is identified on the list 108, the access control system 102 may determine that the user 210 is not permitted to cross the international border, and/or may determine that the level of security measures should be raised against the user 210. If the user 210 is identified on the list 106, the access control system 102 may determine that the user 210 is permitted to cross the international border, and/or may determine that the level of security measures should be lowered for the user 210. If the user 210 is found on both lists 106 and 108, the access control system 102 may request that an administrator review the discrepancy and confirm whether the user 210 should or should not be allowed to cross the border.

If one or more of the contents of the packages 202 are found on the list of unauthorized goods 242, the access control system 102 may determine that the user 210 is not permitted to cross the international border with the shipment of packages 202, and/or may determine that the level of security measures should be raised against the user 210. If none of the contents of the packages 202 are found on the list of unauthorized goods 242, the access control system 102 may determine that the user 210 is permitted to cross the international border with the shipment of packages 202, and/or may determine that the level of security measures should be lowered against the user 210.

Depending on the determinations made, the access control system 102 may generate one or more notifications and instructions to be sent to various external devices. One or more of these generated notifications and instructions may be made part of, by the access control system 102, instructions/notification(s) 226. For example, the access control system 102 may generate a notification for the user 210 that they are not permitted to cross the border and to stop their vehicle. The access control system 102 may also generate instructions for the user device 212 to start sending location data to the management system 122 at a faster rate, or instructions for the management system 122 to start requesting location data from the user device 212 more frequently.

Depending on the determinations made and the type of access control system that that the access control system 102 is, the access control system 102 may perform one or more actions. For example, if the access control system 102 determines that the user 210 is unauthorized (e.g., is not permitted to enter country A, or is not permitted to leave country B), or that all or part of the shipment of packages 202 is unauthorized, and if the access control system 102 is a PACS, then the access control system 102 may raise one or more barriers, such as one or more road barriers, to prevent the user 210 from crossing the international boundary. If the access control system 102 determines that the user 210 is unauthorized (e.g., is not permitted to enter country A, or is not permitted to leave country B), or that all or part of the shipment of packages 202 is unauthorized, and if the access control system 102 is a TMS, then the access control system 102 may divert traffic or change traffic patterns in order to bring the user 210 to a certain area, to keep the user 210 at a certain area, to move other citizens away from the user 210, and/or to provide an avenue for personnel to quickly intercept the user 210. The access control system 102 may accomplish this by closing lanes of traffic through a checkpoint, opening lanes of traffic through a checkpoint, closing a lane, opening a lane, manipulating traffic lights to encourage various actions, or the like. If the access control system 102 determines that the user 210 is unauthorized (e.g., is not permitted to enter country A, or is not permitted to leave country B), or that all or part of the shipment of packages 202 is unauthorized, and if the access control system 102 is a PECS, then the access control system 102 may lock or otherwise disable one or more pedestrian gates to prevent the user 210 from gaining access, or may manipulate the predestination gates to divert pedestrian traffic or change pedestrian traffic patterns in order to bring the user 210 to a certain area, to keep the user 210 at a certain area, to move other citizens away from the user 210, and/or to provide an avenue for personnel to quickly intercept the user 210.

Similarly, if the access control system 102 determines that the user 210 is authorized (e.g., is permitted to enter country A, and/or is permitted to leave country B) and that all the shipment of packages 202 is authorized, and if the access control system 102 is a PACS, then the access control system 102 may lower one or more barriers, such as one or more road barriers, to facilitate the user 210 crossing the international boundary, e.g., to speed up their entry into country A. If the access control system 102 determines that the user 210 is authorized (e.g., is permitted to enter country A, and/or is permitted to leave country B) and that all the shipment of packages 202 is authorized, and if the access control system 102 is a TMS, then the access control system 102 may divert traffic or change traffic patterns in order to bring the user 210 to a checkpoint faster, or to bring the user to an auxiliary checkpoint for those who have been determined to be authorized. The access control system 102 may accomplish this by opening lanes of traffic through a checkpoint, opening a lane, manipulating traffic lights to encourage various actions, or the like. If the access control system 102 determines that the user 110 is authorized (e.g., is permitted to enter country A, and/or is permitted to leave country B) and that all the shipment of packages 202 is authorized, and if the access control system 102 is a PECS, then the access control system 102 may unlock or otherwise enable one or more pedestrian gates to facilitate the user 210 gaining access, or may manipulate the predestination gates to divert pedestrian traffic or change pedestrian traffic patterns in order to provide the user 210 acce2s more quickly, to move other citizens away from the user 210, or to move the user 110 to an fast track gate for those who were determined to be authorized.

At stage H, the access control system 102 sends the instructions/notification(s) 226 to the management system 122.

At stage I, the management system 122 sends notification(s) 228 to the user device 212. The notification(s) 228 may include one or more notifications included in the instructions/notification(s) 226. The notification(s) 228 may include one or more modified versions of notifications included in the instructions/notification(s) 226.

In some implementations, the systems 100a, 100b, and 200 are applicable to administering control of travel to areas other than international borders. For example, the systems 100a, 100b, and 200 are applicable to administrating control of travel between national boundaries such as between states. The systems 100a, 100b, and 200 may also be used in other settings, such as high security settings. For example, the systems 100a, 100b, and 200 may be used to control access at airports.

Figure 3:
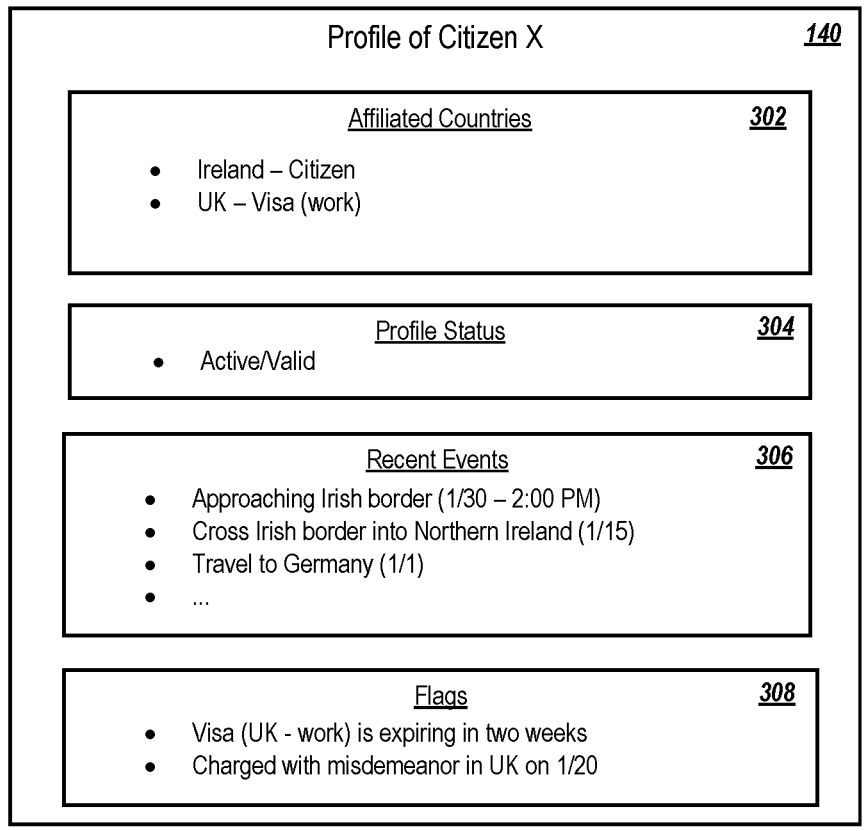
FIG. 3 is a diagram showing an example profile of a citizen.

FIG. 3 is a diagram showing an example profile of a citizen. As shown, the profile 140 for citizen "X" includes an indication of affiliated countries 302, a profile status 304, recent events 306, and flags 308. With respect to FIG. 1A, the profile 140 may be generated by the user device 112. With respect to FIGS. 1B-2, the profile 140 may be generated by the management system 122.

The affiliated countries 302 provides a list of countries that are affiliated with citizen X and an indication of the type of affiliation. For example, as shown, citizen X is affiliated with Ireland and the UK. Specifically, citizen X is a citizen of Ireland and has a work visa from the UK.

The profile status 304 provides an indication of whether citizen X's profile is currently active/valid or revoked/void. Here, citizen X's profile is currently active/valid. As an example, the access control system 102, e.g., through the management system 122, may revoke citizen X's profile/registration upon determining that the citizen X's is on the list 108.

The recent events 306 includes a list of events corresponding to citizen X. These events may include traveling events, events corresponding to the crossing of a border, events corresponding to attempted crossings of a border, events corresponding to approaching a border, or the like. The recent events 306 may also include ancillary information, such as a date and time when the event occurred or when the event was recorded. As example, the recent events 306 for citizen X include a recordation that citizen X approached the Irish border on January 30 at about 2:00 PM, that citizen X crossed the Irish border into Northern Ireland on January 15, and that citizen X traveled to Germany on January 1.

The flags 308 includes a list of warnings that have been associated with the profile 140. These warnings may be communicated to the access control system 102 shown in FIGS. 1A-2 and/or to one or more government agencies. The access control system 102 or the management system 122 may attach a flag to a user's profile if their identification is near expiration (e.g., expires in a month, two weeks, or a week away from expiring) or if their visa is near expiration (e.g., expires in a month, two weeks, or a week away from expiring) as this may indicate a heightened risk of the user unlawfully remaining in the country they are attempting to enter, or a heightened risk of the user being unable to leave the country they are attempting to enter. A flag may also be attached to a user's profile if the access control system 102 or the management system 122 determines that the user is not legally permitted to leave the current country or has pending criminal proceedings in the current country. A flag may also be attached to a user's profile if the access control system 102 or the management system 122 determines that the user has demonstrated risky or suspicious behavior in the past. Such behavior may include past criminal convictions such as felony criminal convictions, having previously entered a country unlawfully, having previously attempted to enter a country unlawfully, or the like. As shown, citizen X has two flags on the profile 140. The first flag is due to citizen X's work visa expiring in two weeks. The second flag is due to citizen X having pending criminal proceedings in the UK as he has been charged with a misdemeanor on January 20.

FIG. 4 is a diagram showing an example profile of a shipment. As shown, the shipment profile 224 for a shipment "A" includes an itinerary and transportation information 403, contents 404, recent events 406, and flags 408. With respect to FIG. 2, the shipment profile 224 may be generated by the management system 122 based on the goods data 218. In some implementations, the user device 212 may generate the shipment profile 224 based on the goods data 218.

The itinerary and transportation information 403 provides the itinerary for shipment A as well as an indication of how the shipment is being transported. The itinerary and transportation information 403 may include a source or pick-up location, a destination or drop-off location, and/or indication of how the shipment will be transported. For example, the indication may include a type of transport (e.g., truck, ferry, plane, etc.), identifying information of the vehicle transporting the shipment (e.g., a license plate), and/or identifying information of the person transporting the shipment. For example, as shown, shipment A was picked up in Dublin Ireland on January 30 and is expected to be dropped off in London on January 31. Shipment A is being transported by truck having license plate #05-D-12345 and by Ferry.

The contents 404 provides an indication of what contents shipment A contains and the amount of contents shipment A contains. These contents may be broken down by individual packages. For example, as shown, shipment A includes two packages of laptop computers weighing or expected to weigh 5,000 kg, one package of cosmetics A weighing or expected to weigh 2,000 kg, and one package of cosmetics B weighing or expected to weigh 1,900 kg.

The recent events 406 includes a list of events corresponding to shipment A. These events may include traveling events, events corresponding to the crossing of a border, events corresponding to attempted crossings of a border, events corresponding to approaching a border, or the like. The recent events 406 may also include ancillary information, such as a date and time when the event occurred or when the event was recorded. As example, the recent events 406 for shipment A include a recordation that the shipment was picked up at 8:00 AM on January 30 and that the shipment was approaching the Irish border at 1:00 PM on January 30.

The flags 408 includes a list of warnings that have been associated with the shipment profile 224. These warnings may be communicated to the access control system 102 shown in FIGS. 1A-2 and/or to one or more government agencies. The access control system 102 or the management system 122 may attach a flag to a shipment profile if the shipment is known to contain contents that are restricted or banned from importation, is known to contain contents in a quantity that is restricted or banned from importation, or the like. For example, as shown, the management system 122 and/or the access control system 102 have determined that UK has banned the importation of cosmetics A, which shipment A contains. Accordingly, the management system 122 and/or the access control system 102 have flagged the shipment profile 224. Such a flag will likely result in the access control system 102 performing one or more actions to prevent shipment A from crossing the Irish border with the package of cosmetics A. A flag may also be attached to the shipment profile 224 if the total expected weight of shipment A based on the contents 404 deviates significantly (e.g., greater or less than 5%, greater or less than 7%, greater or less than 10%, etc.) from actual measured weight of the shipment. Such a flag will likely result in the access control system 102 performing one or more actions to prevent shipment A from crossing the Irish border until shipment A is inspected.

FIGS. 5A-5D are diagrams depicting a citizen approaching a border.

Figure 5A:
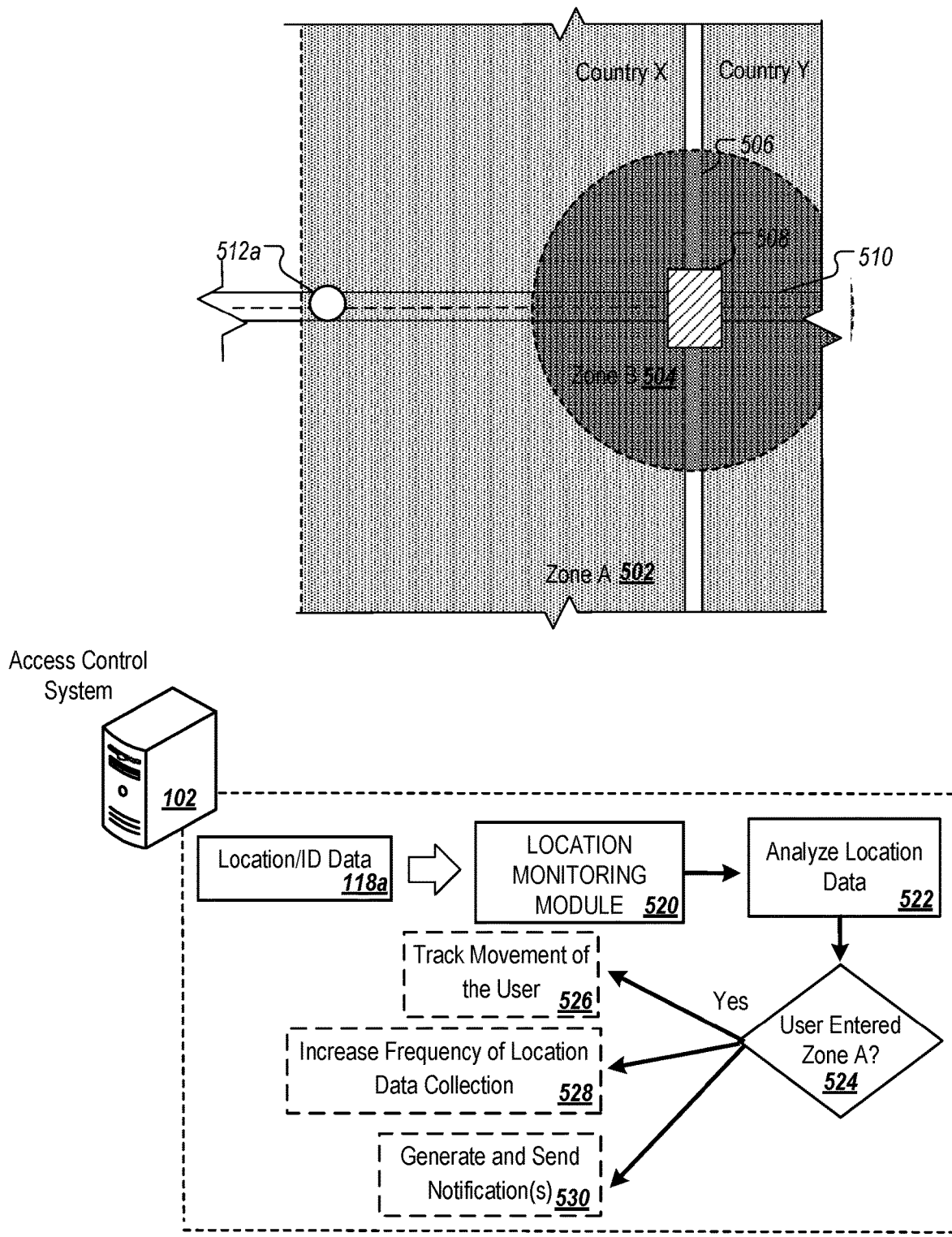
FIGS. 5A-5D are diagrams depicting a citizen approaching a managing geospatial boundaries.

FIG. 5A depicts the user 110 having entered a first zone 502 along a road 510. The zone 502 may be defined by being a threshold distance from the border 506 separating country X from country Y. Also shown is a second zone 504 that is a different threshold distance from a border control checkpoint 508. Upon entering zone 502, location/ID data 118a is sent to the access control system 102 from the user device 112 of the user 110. The location/ID data 118a indicates that the user device is located at position 512a in the zone 502.

The access control system 102 may have used the location/ID data 118a to determine that the user 110 is unauthorized, or is otherwise a high risk individual. The access control system 102 may determine that increased security measures are needed for the user 110.

As shown, the access control system 102 provides the location/ID data 118a to a location monitoring module 520. The location monitoring module 520 analyzes the location data of the user 110 (522). The location monitoring module 520 then determines if the user 110 has entered zone 502, or confirms that the user 110 has entered zone 502 (524), e.g., comparing the location/ID data 118b with mapping data.

If the location monitoring module 520 determines or confirms that the user 110 has entered the zone 502, the access control system 102 may perform one or more actions. For example, the access control system 102 may track the movement of the user (526) which would involve saving the location data corresponding to the user 110, requesting or receiving new location data, and comparing the saved location data to the new location data. The access control system 102 may additionally or alternatively increase the frequency of location data collection (528) by instructing the user device 112 to send location data more frequently to the access control system 102, or instructing the user device 112 to stream location data to the access control system 102. The access control system 102 may additionally or alternatively generate and send one or more notifications (530). One or more of these notifications may be sent to the user 110, such as a notification that the user 110 is not authorized to cross the border 506. One or more of these notifications may be sent to personnel at the checkpoint 508.

Figure 5B:
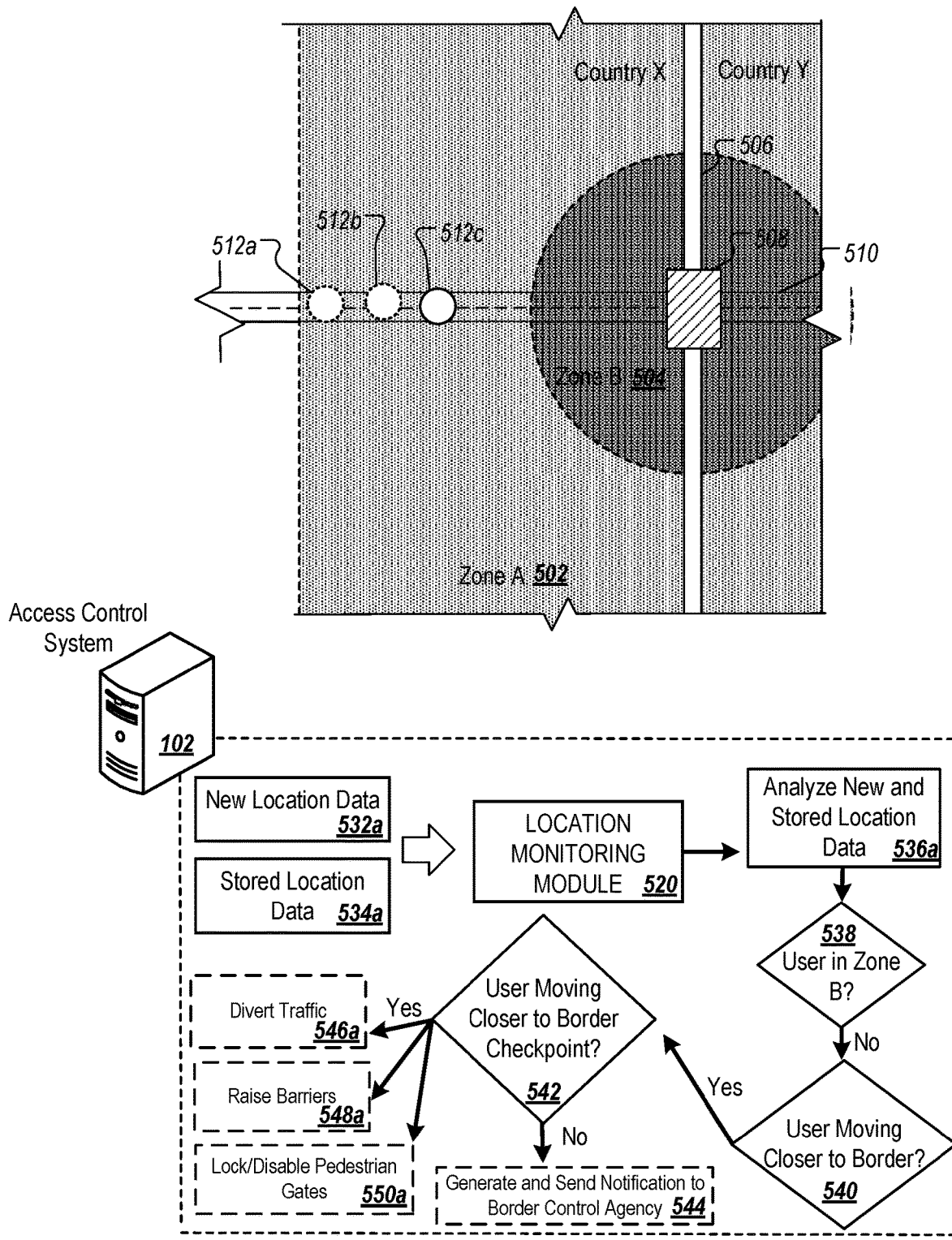

FIG. 5B depicts the user 110 moving towards the checkpoint 508 in the first zone 502 along the road 510, and the access control system 102 having begun to track the user 110 and/or having requested more frequent location data from the user device 112. The user device 112 of the user 110 is currently located at position 512c. The stored location data 534a includes an indication of the position 512a and a position 512b of the user device 112 of the user 110, e.g., the location data 534a includes coordinate data that corresponds to the location of the user device 112 at past times. New location data 532a includes an indication the current position 512c, e.g., the most recent coordinates of the user device 112 based on output of a GPS unit of the user device 112.

As shown, the access control system 102 provides the new location data 532a and the stored location data 534a to the location monitoring module 520. The location monitoring module 520 analyzes the new and stored location data of the user 110 (536a). The location monitoring module 520 then determines if the user 110 is in zone 504 (538). Here, the location monitoring module 520 has determined that the user 110 is not in zone 504. The location monitoring module 520 then determines if the user 110 is moving in a direction that is bringing them closer to the border 506 (540), e.g., based on a comparison of the new location data 532a and the stored location data 534a. Here, the location monitoring module 520 has determined that the user 110 is moving in a direction that is bringing them closer to the border 506. The location monitoring module 520 then determines if the user 110 is moving in a direction that is bringing them closer to the checkpoint 508 (542), e.g., based on a comparison of the new location data 532a and the stored location data 534a. If the location monitoring module 520 determined that the user 110 is moving away from the checkpoint 508 (but still closer to the border 506), the access control system 102 may have generated and sent a notification to a border control agency of country X, a border control agency of country Y, or a joint border control agency of both countries (544). Here, the location monitoring module 520 has determined that the user 110 is moving in a direction that is bringing them closer to the checkpoint 508. Based on this determination, the access control system 102 may perform one or more actions. For example, the access control system 102 may divert traffic (546a), may raise one or more barriers (548a), and/or may lock/disable one or more pedestrian gates or turnstiles (550a).

Figure 5C:
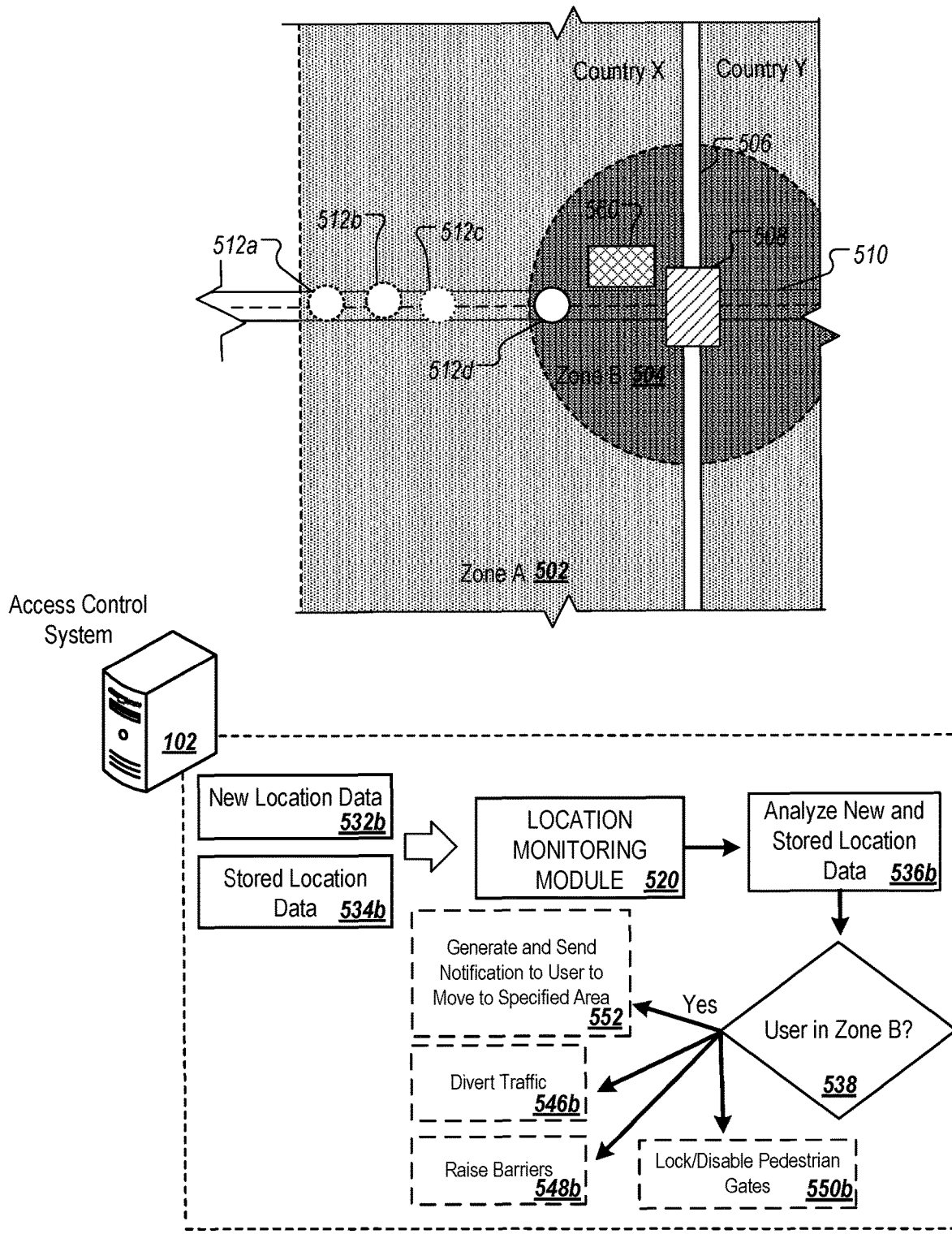

FIG. 5C depicts the user 110 having entered zone 504 moving towards the checkpoint 508 along the road 510, and the access control system 102 continuing to track the user 110. The user device 112 of the user 110 is currently located at position 512d. The stored location data 534b includes an indication of the position 512a, of the position 512b, and of the position 512c of the user device 112 of the user 110, e.g., the location data 534b includes coordinate data that corresponds to the location of the user device 112 at past times. New location data 532b includes an indication the current position 512d, e.g., the most recent coordinates of the user device 112 based on output of a GPS unit of the user device 112.

As shown, the access control system 102 provides the new location data 532b and the stored location data 534b to the location monitoring module 520. The location monitoring module 520 analyzes the new and stored location data of the user 110 (536b). The location monitoring module 520 then determines if the user 110 is in zone 504 (538), e.g., by comparing the new location data 532b with mapping data. Here, the location monitoring module 520 has determined that the user 110 is in zone 504. Based on this determination, the access control system 102 may perform one or more actions. For example, the access control system 102 may generate and sent a notification to the user 110 to move to a specified area 560 (552), may divert traffic in order to guide the user 110 to the specified area 560 (546b), may raise one or more barriers (548b), and/or may lock/disable one or more pedestrian gates or turnstiles (550b).

Figure 5D:
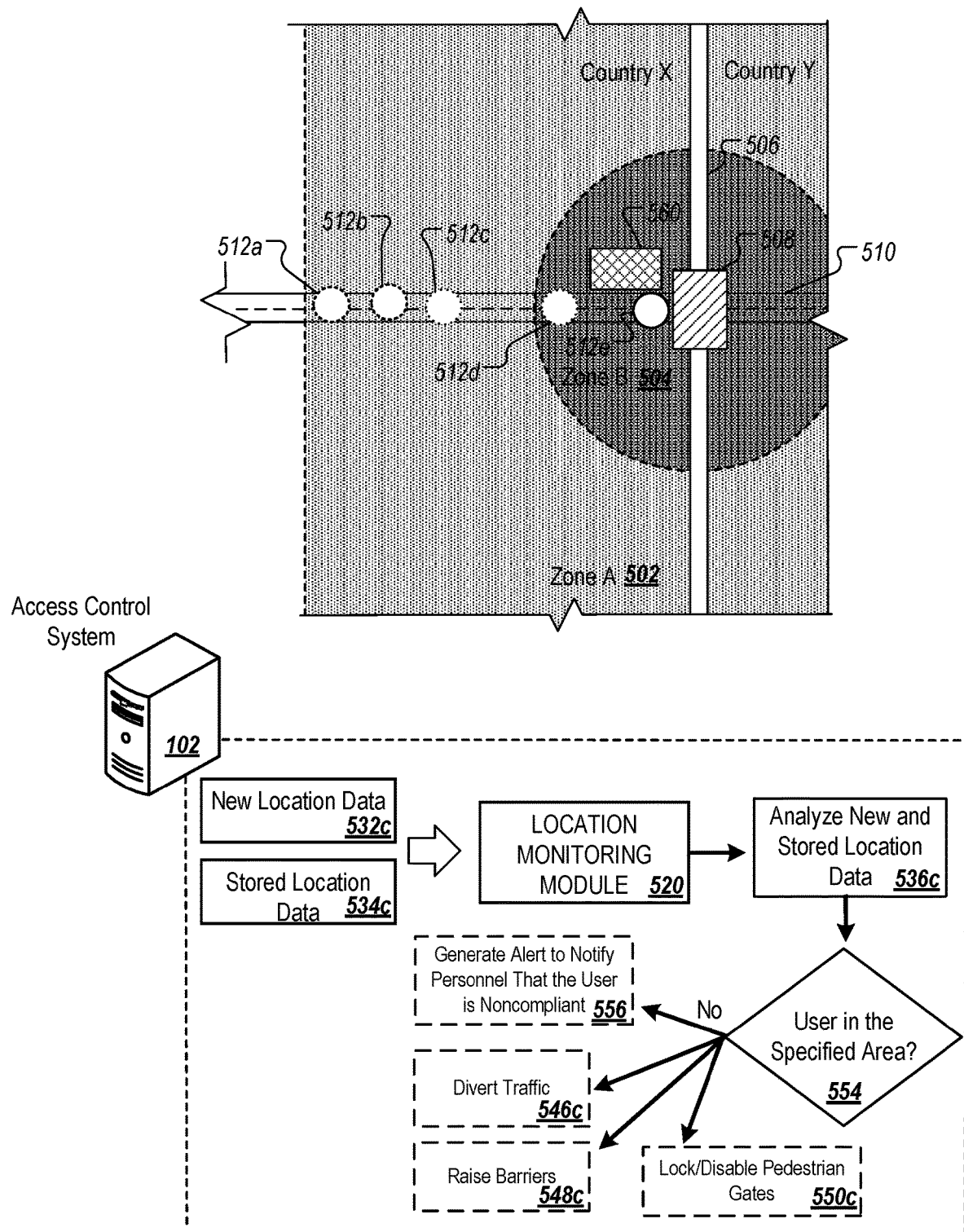

FIG. 5D depicts the user 110 having not moved to the specified area 560 and continuing to move towards the checkpoint 508 along the road 510, and the access control system 102 continuing to track the user 110. The user device 112 of the user 110 is currently located at position 512e. The stored location data 534c includes an indication of the position 512a, of the position 512b, of the position 512c, and of the position 512d of the user device 112 of the user 110, e.g., the location data 534c includes coordinate data that corresponds to the location of the user device 112 at past times. New location data 532c includes an indication the current position 512e, e.g., the most recent coordinates of the user device 112 based on output of a GPS unit of the user device 112.

As shown, the access control system 102 provides the new location data 532c and the stored location data 534c to the location monitoring module 520. The location monitoring module 520 analyzes the new and stored location data of the user 110 (536c). The location monitoring module 520 then determines if the user 110 has moved to the specified area 560 (554), e.g., by comparing the new location data 532b with mapping data. Here, the location monitoring module 520 has determined that the user 110 is not in the specified area 560. Based on this determination, the access control system 102 may perform one or more actions. For example, the access control system 102 may conclude the user 110 is noncompliant and, in response, may generate an alert in the system to notify personnel, e.g., at the checkpoint 508, that the user 110 is noncompliant (556). The access control system 102 may also or alternatively divert traffic (546c), raise one or more barriers (548c), and/or lock/disable one or more pedestrian gates or turnstiles (550c).

Figure 6:
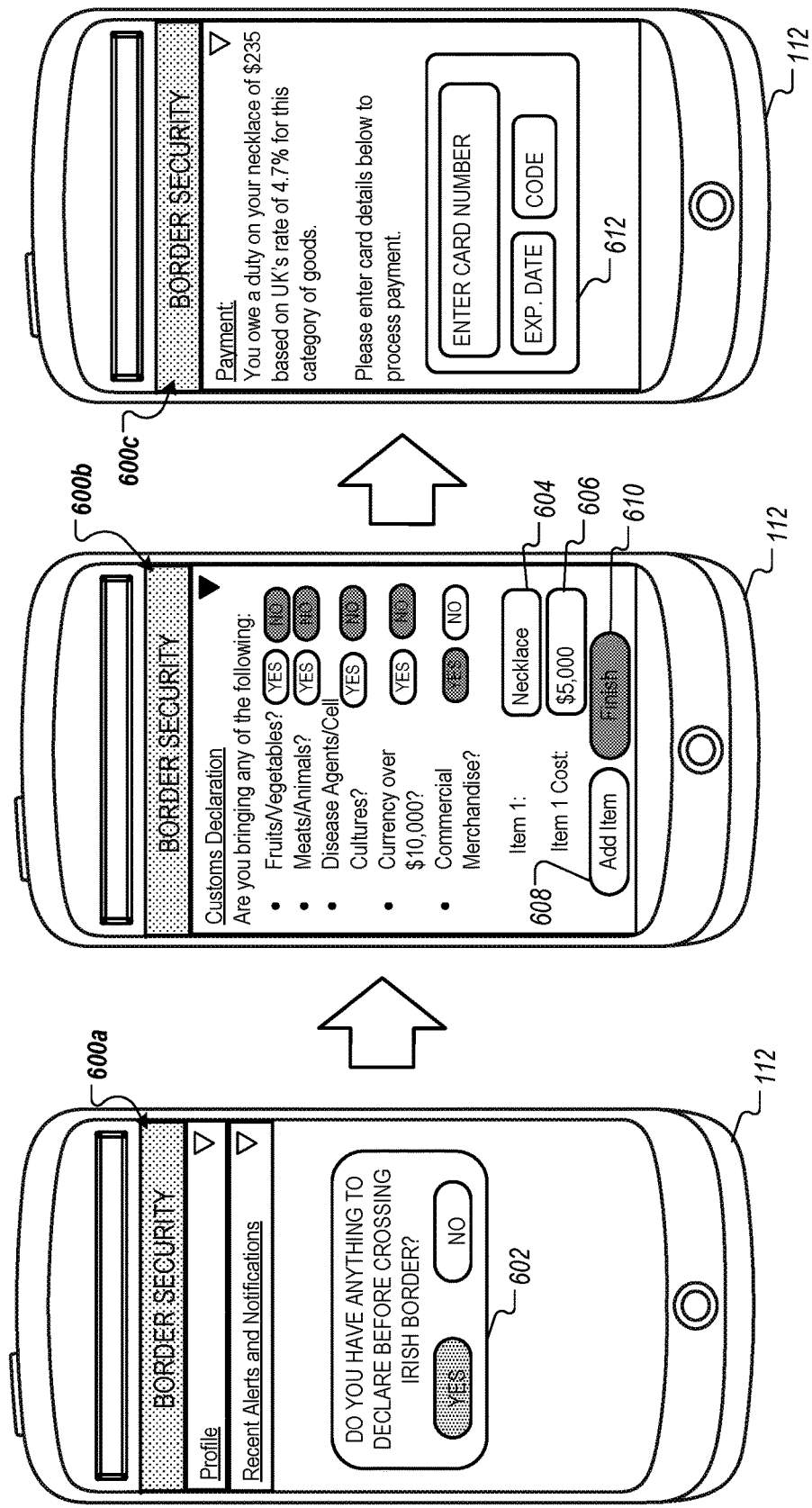
FIG. 6 are diagrams depicting example interfaces of a mobile application used for managing geospatial boundaries.

FIG. 6 are diagrams depicting example interfaces 600a-600c of a mobile application used for managing geospatial boundaries.

As shown, an interface 600a of a mobile border security application running on the user device 112 displays an alert 602. The alert 602 asks if the user 110 has anything to declare before crossing the Irish border. The alert 602 may have been generated based on the user device 112, the access control system 102, and/or the management system 122 determining that the user 110 was approaching the Irish border, or was within a threshold distance of the Irish border. Here, the user 110 has selected they an interface element "Yes" to indicate that he does have something to declare to customs before entering the UK.

Upon selecting the interface element "Yes", the user 110 is presented an interface 600b. The interface 600b is customs declaration page on the mobile border security application. The interface 600b includes a variety of yes or no questions as to things or items that the user 110 may wish to declare. Each of the questions also includes corresponding interface elements where the user 110 can indicate "Yes" or "No" for each of the questions. Here, the user 110 has selected each of the "No" interface elements for all of the questions other than the question asking whether the user 110 has any commercial merchandise that he needs to disclose. For this question, the user 110 has selected the interface element "yes" which resulted in the interface 600b presenting fields 604 and 606 for the user 110 to describe the merchandise purchased, an option 608 to add additional items, and an option 610 to finish the declaration. Here, the user 110 entered a description of the item in a first field 604 and a price of the item in a second field 606. The user 110 then selected the finish option 610.

Upon selecting the finish option 610, the user 110 is presented an interface 600c. The interface 600c is a payment page for the mobile border security application. The interface 600c provides an indication of what the user 110 needs to pay (e.g., duties, fees, and/or taxes) based on their declaration. The mobile border security application may access one or more external servers to obtain duty rates for various categories of goods and/or tax rates. Here, the mobile border security application has determined that the user 110 needs to pay $235 based on the description provided by the user 110 in his declaration and by a determined duty rate of 4.7% for the declared item. The interface 600c also presents a number of fields 612 where the user 110 can enter their credit card information to make the necessary payment.

Figure 7:
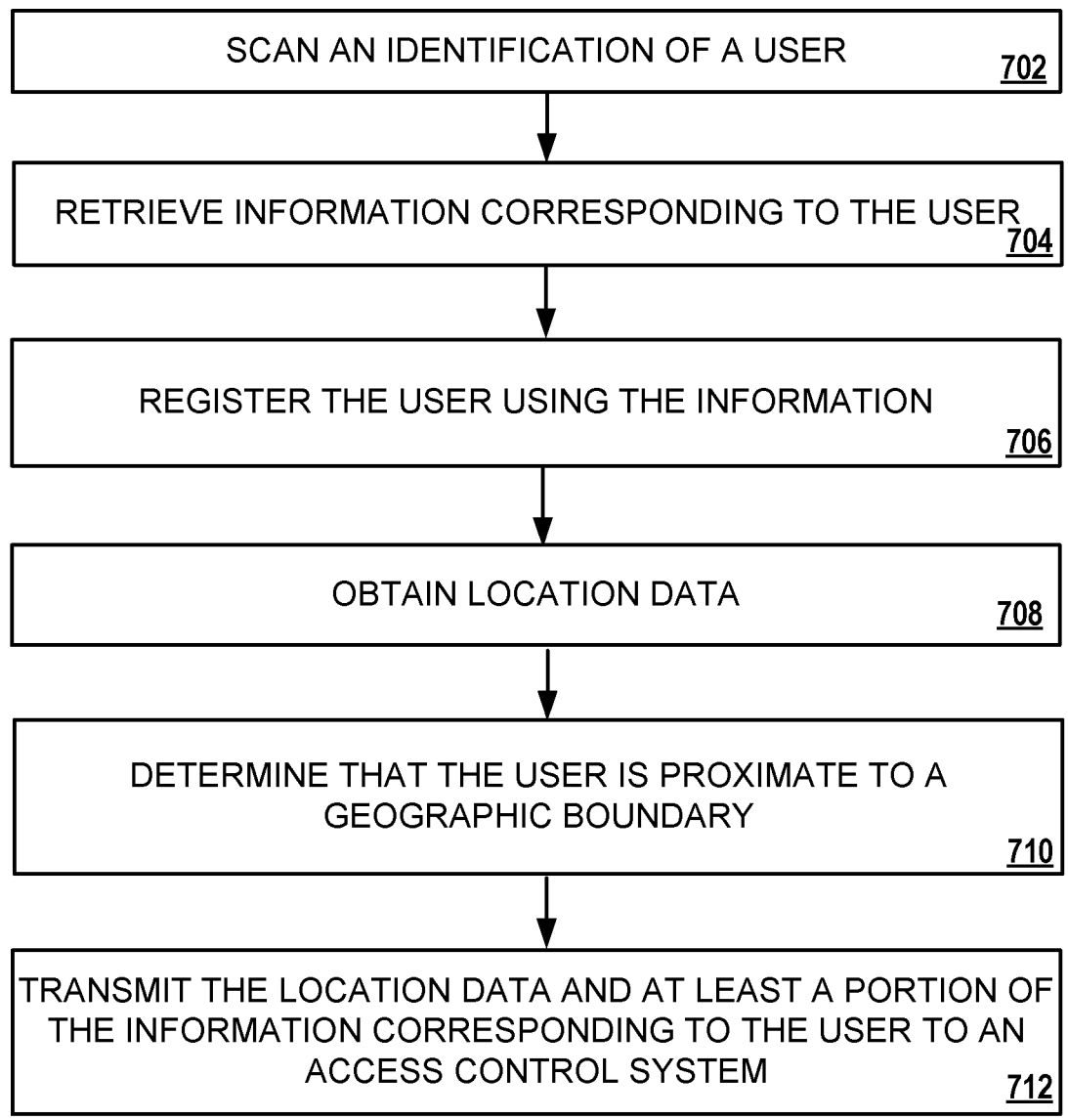
FIG. 7 is a flowchart diagram depicting an example process for managing geospatial boundaries.

FIG. 7 is a flowchart diagram depicting an example process 700 for managing geospatial boundaries. The process 700 can be performed, at least in part, using the system 100a, the system 100b, or the system 200 described herein.

The process 700 includes scanning an identification of a user (702). The identification of a user may include, for example, a passport, a visa, or a license issued by a country. The identification may also include an electronic identification accessible by a computing device, or accessible through an application on the computing device. The identification may be scanned by taking one or more images of the identification using an onboard camera, such as a camera on the user device 112 shown in FIGS. 1A-1B. If the identification includes a radio-frequency identification tag, the identification may be scanned by sending a signal to a radio-frequency identification tag on the identification receiving, e.g., capturing a response from the radio-frequency identification tag. The signal sent to the radio-frequency identification tag may be sent through a radio-frequency identification reader, such as an onboard RFID reader of the user device 112. If the identification is an electronic identification, the identification may be scanned by scanning a code (e.g., QR code) presented on an application of a computing device with access to the electronic ID, or by capturing images of the identification presented on an application of a computing device.

The process 700 includes retrieving information corresponding to the user (704). The information may include for example, identification data or location data. With respect to FIG. 1A, the information may include information contained in the ID Data 116, information contained in the location/ID data 118a. As an example, the information may include a name of the user, an identification number corresponding to the user, an address of the user, a date of identification issuance, a date of identification expiration, a birth date of the user, an age of the user, a sex of the user, a picture of the user, a country that issued the identification, an indication of a type of identification that the identification belongs to (e.g., passport, electronic ID, visa, or license), a country where the user is a citizen, and/or a country where the user has a visa.

The process 700 includes registering the user using the information (706). With respect to FIGS. 1A-1B, registering the user may involve registering the user through a mobile application running on the mobile device 112 of the user. With respect to FIG. 1B, registering the user may additionally or alternatively involve generating the profile 140 for the user. A registration of the user may be revoked if, for example, the user is determined by the access control system 102 to not be authorized to leave country he is currently located, to not be authorized to travel, to not be authorized to enter a country that the user is attempting to enter, the user has a pending criminal matter in country he is currently located in, one or more identifications of the user have expired or the like. A registration of the user may be flagged if, for example, the user is determined by the access control system 102 to not be authorized to leave a country, to not be authorized to travel to one or more countries, to not be authorized to enter a country, the user has a pending criminal matter in a country, the user has significant or travel relevant past criminal convictions, the user unlawfully entered a country before, the user has attempted to unlawfully enter a country before, one or more identifications of the user have expired, one or more identifications of the user are close to expiring (e.g., set to expire in a month, in two weeks, in a week, in a day, etc.), or the like.

The process 700 includes obtaining location data (708). With respect to FIG. 1A, the location data may be part of the location/ID data 118a. With respect to FIG. 1B, the location data may be part of the location/ID data 118b, and/or the location/ID data 126. The location data may include the output of one or more GPS sensors of the user device 112. The location data may indicate geographic coordinates.

The process 700 includes determining that the user is proximate to a geographic boundary (710). The geographic boundary may include a border such as an international border between two countries. The geographic boundary may include virtual borders existing within a country or between multiple countries determined by geospatial data. Determining if a user is proximate to a geographic boundary can be based on a comparison of the location data with geospatial data, such as mapping data. The system 100a-100b may determine that the user is proximate to a geographic boundary if the user is approaching the geographic boundary within a threshold period of time required to activate a traffic control system, if the user is within a threshold distance of the geographic boundary, it the user is approaching the geographic boundary within a threshold period of time required to activate a traffic control system and is within a threshold distance of the geographic boundary.

In some implementations, instead of a geographic boundary, the process 700 includes determining that the user is proximate to a security checkpoint, e.g., that the user is approaching a security checkpoint or is within a threshold distance of a security checkpoint. The security checkpoint may be for a geographic boundary. The security checkpoint may belong to a high security area instead of a geographic boundary. Such high security areas may include, for example, research facilities, airports, and/or government buildings.

The process 700 includes transmitting the location data and at least a portion of the information corresponding to the user to an access control system (712). In some implementations, all of the information is provided to the access control system, e.g., where the access control system is fully trusted. In some implementations, highly confident or sensitive information corresponding to the user is not provided to the access control system. The information provided to the access control system may be encrypted before it is sent.

Figure 8:
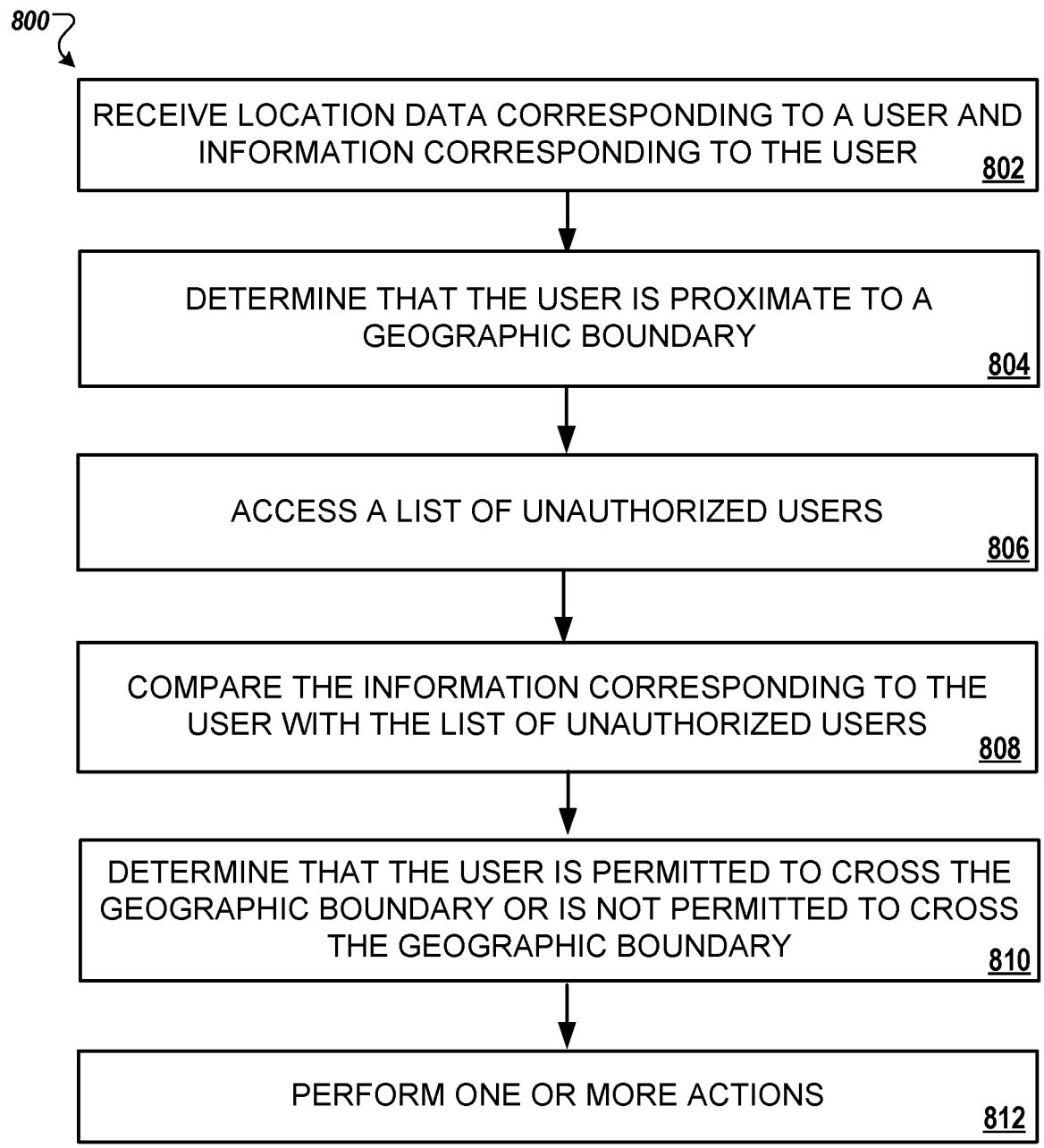
FIG. 8 is a flowchart diagram depicting an example process for managing geospatial boundaries.

FIG. 8 is a flowchart diagram depicting an example process 800 for managing geospatial boundaries. The process 800 can be performed, at least in part, using the system 100a, the system 100b, or the system 200 described herein.

The process 800 includes receiving location data corresponding to a user and information corresponding to the user (802). With respect to FIG. 1A, the location data may be part of the location/ID data 118a. With respect to FIG. 1B, the location data may be part of the location/ID data 118b, and/or the location/ID data 126. The location data may include the output of one or more GPS sensors of the user device 112. The location data may indicate geographic coordinates.

The process 800 includes determining that the user is proximate to a geographic boundary (804). The geographic boundary may include a border such as an international border between two countries. The geographic boundary may include virtual borders existing within a country or between multiple countries determined by geospatial data. Determining if a user is proximate to a geographic boundary can be based on a comparison of the location data with geospatial data, such as mapping data. The system 100a-100b may determine that the user is proximate to a geographic boundary if the user is approaching the geographic boundary within a threshold period of time required to activate a traffic control system, if the user is within a threshold distance of the geographic boundary, it the user is approaching the geographic boundary within a threshold period of time required to activate a traffic control system and is within a threshold distance of the geographic boundary.

The process 800 includes accessing a list of unauthorized users (806). With respect to FIG. 1B-2, the list may be the list 108 of unauthorized citizens. The list may be generated based off information obtained from one or more remote systems 160. As an example, the list may be a no fly list obtained from a TSA server.

The process 800 includes comparing the information corresponding to the user with the list of unauthorized users (808). With respect to FIG. 1B, comparing the information corresponding to the user may include comparing information contained in the citizen profile 140 with the list 108. Alternatively or additionally, comparing the information corresponding to the user may include comparing information contained in the location/ID data 118b with the list 108.

The process 800 includes determining that the user is permitted to cross the geographic boundary or is not permitted to cross the geographic boundary (810). With respect to FIG. 1B, the user may be permitted if the access control system 102 determines that they are not on the list 108 and/or that they are on the list 106. The user may be not permitted if the access control system 102 determines that they are on the list 108 and/or that they are not on the list 106.

The process 800 includes performing one or more actions (812). These actions could include automatic manipulation of controls that the access control system 102 has access to. For example, these actions can include raising or lowering a physical barrier at the geographic boundary, changing a pattern of traffic proximate to the geographic boundary, and/or locking or unlocking a pedestrian gate at the geographic boundary. These actions can include the generation and sending of notifications to the user and/or to v, e.g., personnel located at a security checkpoint of the geographic boundary. These actions can include generating a system alert to notify personnel, e.g., about the presence of a noncompliant user.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
  receiving, from a mobile device of a user and over a wireless network, information corresponding to a user, the information including first geospatial data generated using the mobile device, wherein the first geospatial data provides an approximate location of the mobile device;
  based on the information including the first geospatial data, accessing a list of one or more travel permissions corresponding to at least one of a virtual border and the user, wherein the virtual border is a digital boundary defined by second geospatial data;
  based on the one or more travel permissions, determining that the user lacks permission to cross the virtual border;
  in response to the determination, generating a notification; and
  wirelessly transmitting the notification to one or more computing devices.

2. The method of claim 1, wherein receiving the information comprises at least one of:
  receiving a credential corresponding to the user;
  receiving information retrieved from an identification of the user; or
  receiving information retrieved from a profile of the user.

3. The method of claim 1, wherein accessing the list of travel permissions includes accessing a list of travel permissions generated by a government agency.

4. The method of claim 1, wherein determining that the user lacks permission to cross the virtual border comprises determining at least one of the following:
  that the user lacks permission to exit a first geographic area bordering the virtual border,
  that the user lacks permission to enter a second geographic area bordering the virtual border,
  that further analysis is needed to determine if the user is permitted to exit the first geographic area,
  that further analysis is needed to determine if the user is permitted to enter the second geographic area, or
  that the user must navigate to a third geographic area or location within either the first geographic area or the second geographic area.

5. The method of claim 4, wherein the first geographic area is adjacent to the second geographic area.

6. The method of claim 1, wherein wirelessly transmitting the notification to the one or more computing devices comprising transmitting the notification to at least one of the mobile device, a computing device of the user, an access control system, a computer system of a government agency, or computing devices of personnel of a government agency.

7. The method of claim 1, wherein:
  receiving the information corresponding to the user comprises obtaining previous geospatial data for the user; and
  determining that the user lacks permission to cross the virtual border comprises:
    identifying a particular geographic area adjacent to the virtual border that the user is not permitted to travel to; and
    based on the previous geospatial data corresponding to the particular geographic area, determining at least one of the following:
      that the user lacks permission to exit a first geographic area adjacent to the virtual border,
      that the user lacks permission to enter a second geographic area adjacent to the virtual border, or
      that the user must navigate to a third geographic area or location.

8. The method of claim 1, wherein:
  receiving the information corresponding to the user comprises receiving information that is used to access a profile of the user, the profile of the user containing information that indicates one or more geographic areas affiliated with the user;
  determining that the user lacks permission to cross the virtual border comprises:
    identifying a particular geographic area adjacent to the virtual border that is unlawful for the user to enter or to exit based on the one or more geographic areas affiliated with the user; and
    based on the particular geographic area, determining at least one of the following:
      that the user lacks permission to exit a first geographic area adjacent to the virtual border,
      that the user lacks permission to enter a second geographic area adjacent to the virtual border, or
      that the user must navigate to a third geographic area or location.

9. The method of claim 1, wherein:
  determining that the user lacks permission to cross the virtual border comprises comparing the list of travel permissions with the information to:
    determine that the user had previously entered a geographic area that the user lacked permission to enter, or exited a geographic area that they lacked permission to exit, and
    in response to determining that the user had previously entered the geographic area that the user lacked permission to enter, or exited the geographic area that they lacked permission to exit, determine that the user is not compliant with the list of travel permissions and must navigate to a different geographic area or location; and
  generating the notification comprises generating an alert indicating that the user must navigate to the different geographic area.

10. The method of claim 9, wherein determining that the user had previously entered the geographic area that they were not permitted to enter, or exited the geographic area that they were not permitted to exit comprises determining that the user had previously entered or exited a geographic area unlawfully.

11. The method of claim 1, wherein:
  receiving the information corresponding to the user comprises:
    receiving a credential of the user; and
    in response to receiving the credential of the user, accessing a profile corresponding to the user,
  accessing the list of travel permissions comprises accessing a list of users who are permitted to exit a first geographic area adjacent to the virtual border or to enter a second geographic area adjacent to the virtual border, and determining that the user lacks permission to cross the virtual border comprises comparing the list of users who are permitted to exit the first geographic area or to enter the second geographic area to an identification in the profile that indicates an identity of the user to determine that the user is not among the list of users.

12. The method of claim 1, wherein accessing the list of one or more travel permissions comprises:
   based on the first geospatial data and the second geospatial data, determining that the mobile device is within a threshold distance of the virtual border; and
   based on the determination that the mobile device is within a threshold distance of the virtual border, accessing the list of one or more travel permissions.

13. The method of claim 1, wherein accessing the list of one or more travel permissions comprises:
   based on the first geospatial data and the second geospatial data, determining that the mobile device has a trajectory that crosses the virtual border; and
   based on the determination that the mobile device has a trajectory that crosses the virtual border, accessing the list of one or more travel permissions.

14. The method of claim 1, wherein accessing the list of one or more travel permissions comprises:
   based on the first geospatial data and the second geospatial data, determining that the mobile device has crossed the virtual border; and
   based on the determination that the mobile device has crossed the virtual border, accessing the list of one or more travel permissions.

15. The method of claim 1, comprising:
   based on the determination, generating instructions to change a configuration of software running on the mobile device; and
   transmitting, to the mobile device and over the wireless network, the instructions.

16. The method of claim 15, wherein generating instructions to change a configuration of software running on the mobile device comprises generating instructions to change a frequency that geospatial data is (i) collected at the mobile device using a sensor of the mobile device, or (ii) transmitted from the mobile device.

17. The method of claim 1, wherein receiving the first geospatial data comprises receiving, from the mobile device and over the wireless network, coordinates obtained using a GPS sensor of the mobile device.

18. A method performed by a computing device, the method comprising:
   scanning, by the computing device, an identification of a user;
   based on the scan, retrieving, by the computing device, information corresponding to the user;
   registering, by the computing device, a profile for the user on a centralized computing platform using the information corresponding to the user, wherein the centralized computing platform is remote with respect to the computer device; and
   in response to registering the profile for the user, receiving, at the computing device and from the centralized computing platform, a travel credential for the user.

19. The method of claim 18,
   determining that the user is proximate to a geospatial boundary of a first geographic area and a second geographic area or is approaching the geospatial boundary; and
   in response to the determination, wirelessly transmitting location data corresponding to the user and the credential to an access control system.

20. The method of claim 19, comprising, based on the transmitted location data and the transmitted credential, receiving a notification indicating at least one of the following:
   that the user is permitted to exit the first geographic area,
   that the user lacks permission to exit the first geographic area,
   that the user is permitted to enter the second geographic area,
   that the user lacks permission to enter the second geographic area,
   that further analysis is needed to determine if the user is permitted to exit the first geographic area,
   that further analysis is needed to determine if the user is permitted to enter the second geographic area, or
   that the user must navigate to a third geographic area.

21. A system comprising:
   one or more computers: and
   one or more computer-readable media storing instructions that, when executed by the one or more computers, cause the one or more computers to perform operations comprising:
      receiving, from a mobile device of a user and over a wireless network, information corresponding to the user while the mobile device is travelling towards a geographic area;
      accessing a list of travel permissions corresponding to the user or the geographic area;
      comparing the list of travel permissions with the information to determine that the user is compliant with the list of travel permissions;
      in response to the determination that the user is compliant, generating instructions for an access control system configured to provide or deny users access to the geographic area, wherein the instructions provide that the access control system is to facilitate entry of the user into the geographic area without interrupting the travel of the mobile device and the user into the geographic area; and
      wirelessly transmitting the instructions to one or more computing devices of the access control system.

22. The system of claim 21, wherein wirelessly transmitting the instructions to the access control system comprises wirelessly transmitting the instructions to an access control system positioned at or proximate to a border of the geographic area,
   wherein the access control system is configured to allow or prevent users from crossing the border of the geographic area.

23. The system of claim 21 wherein generating instructions which provide that the access control system is to facilitate entry of the user into the geographic area without interrupting the travel of the mobile device and the user into the geographic area comprises generating instructions which provide that the access control system is to facilitate entry into the geographic area without interrupting travel of the user and the mobile device by (i) unlocking one or more gates or turnstiles before the user and the mobile device arrive at the gates or turnstiles, (ii) raising one or more barriers before the user and the mobile device arrive at the one or more barriers, or (iii) determining that the user and the mobile device should not be diverted to a specified holding area.

* * * * *